United States Patent
Yuzurihara et al.

(10) Patent No.: US 8,385,096 B2
(45) Date of Patent: Feb. 26, 2013

(54) UNBALANCED VOLTAGE COMPENSATION METHOD, UNBALANCED VOLTAGE COMPENSATOR, THREE-PHASE CONVERTER CONTROL METHOD, AND CONTROLLER OF THREE-PHASE CONVERTER

(75) Inventors: Itsuo Yuzurihara, Zama (JP); Atsushi Takayanagi, Kamakura (JP); Yoshihisa Hata, Yokohama (JP)

(73) Assignee: Kyosan Electric Mfg. Co., Ltd., Yokohama-shi, Kanagawa (JP)

( * ) Notice: Subject to any disclaimer, the term of this patent is extended or adjusted under 35 U.S.C. 154(b) by 246 days.

(21) Appl. No.: 12/958,523

(22) Filed: Dec. 2, 2010

(65) Prior Publication Data
US 2011/0134669 A1    Jun. 9, 2011

(30) Foreign Application Priority Data
Dec. 7, 2009  (JP) .................................. 2009-277824

(51) Int. Cl.
*H02M 7/217* (2006.01)
(52) U.S. Cl. ....................................... 363/127; 307/102
(58) Field of Classification Search .................... 363/44, 363/53, 127; 307/102
See application file for complete search history.

(56) References Cited

U.S. PATENT DOCUMENTS

| | | | |
|---|---|---|---|
| 5,909,366 A * | 6/1999 | Sanada | 363/98 |
| 7,751,211 B2 * | 7/2010 | Yuzurihara et al. | 363/127 |
| 8,248,007 B2 * | 8/2012 | Matsuo et al. | 318/400.02 |

FOREIGN PATENT DOCUMENTS

| | | |
|---|---|---|
| JP | 2003-274559 A | 9/2003 |
| JP | 2004-222447 A | 8/2004 |
| JP | 2008-141887 A | 6/2008 |

OTHER PUBLICATIONS

Ahn, Sung-Chan and Hyun, Dong-Seok "New Control Scheme of Three-Phase PWM AC/DC Converter Without Phase Angle Detection Under the Unbalanced Input Voltage Conditions," IEEE Transactions on Power Electronics, Sep. 2002, vol. 17 No. 5, pp. 616-622.

(Continued)

*Primary Examiner* — Shawn Riley
(74) *Attorney, Agent, or Firm* — Westerman, Hattori, Daniels & Adrian, LLP

(57) ABSTRACT

In compensating for unbalanced voltages of three-phase AC, instantaneous values of wye-phase voltages 120° out of phase with each other are obtained from line voltages using a centroid vector operation, symmetrical component voltages of three-phase balanced system are obtained from the instantaneous values of wye-phase voltages, a compensation signal to compensate unbalanced voltages of three-phase AC is generated from zero-phase-sequence voltage of symmetrical component voltages is generated, wye-phase voltages 120° out of phase, the unbalanced voltages of which are compensated, are obtained from the compensation signal and the symmetrical component voltages, a control signal of a PWM conversion is generated based on the compensated wye-phase voltage compensated, and the unbalanced voltages of three-phase AC are compensated. The amount of time to compensate the three-phase unbalanced voltages required for detecting an unbalance of voltages and generating a control signal can be shortened.

25 Claims, 18 Drawing Sheets

OTHER PUBLICATIONS

Kang, Jun-Koo and Sul, Seung-Ki "Control of Unbalanced Voltage PWM Converter Using Instantaneous Ripple Power Feedback," Power Electronics Specialists Conference, 1997. PESC '97 Record., 28th Annual IEEE, Jun. 22-27, 1997, vol. 1, pp. 503-508.

Kim, H.S. et al "Design of Current Controller for 3-Phase PWM Converter with Unbalanced Input Voltage," IEEE Aug. 1998, pp. 503-509.

Specification for Semiconductor Processing Equipment Voltage SAG Immunity, SEMI F-47-0200, 1999, pp. 859-864.

Specification for Semiconductor Processing Equipment Voltage SAG Immunity, SEMI F47-0706, 199, pp. 1-11, May 2006.

* cited by examiner $e_{1a} = e_{oa} + e_{ko}$
$= (e_{ab} - e_{ca})/3 + e_{ko}$ $e_{1a} = e_{2a} + e_{ko}$
$= (e_{ab} - e_{ca})/3 + e_{1o}$

COMPENSATION FOR VOLTAGE SAG
IS NOT PERFORMED

VOLTAGE SAG COMPENSATION
IS PERFORMED e 1a : 100%→50%→100%

COMPENSATION FOR VOLTAGE SAG
IS NOT PERFORMED

VOLTAGE SAG COMPENSATION
IS PERFORMED e 1a : 50%   e 1b : 100%   e 1c : 100%

COMPENSATION FOR VOLTAGE SAG
IS NOT PERFORMED

VOLTAGE SAG COMPENSATION
IS PERFORMED e 1a : 50%→100%    e 1b : 100%    e 1c : 100%

Input Voltage

Input Current

COMPENSATION FOR
VOLTAGE SAG IS
NOT PERFORMED
(20A/V)

Input Current

COMPENSATION FOR
VOLTAGE SAG IS
PERFORMED
(20A/V)

e 1a : 50%   e 1b : 100%   e 1c : 100%

Input Voltage

Input Current
COMPENSATION FOR
VOLTAGE SAG IS
NOT PERFORMED
(20A/V)

Input Current
COMPENSATION FOR
VOLTAGE SAG IS
PERFORMED
(20A/V)

e 1a : 0%   e 1b : 100%   e 1c : 100%

UNBALANCED VOLTAGE COMPENSATION METHOD, UNBALANCED VOLTAGE COMPENSATOR, THREE-PHASE CONVERTER CONTROL METHOD, AND CONTROLLER OF THREE-PHASE CONVERTER

BACKGROUND OF THE INVENTION

1. Field of the Invention

The present invention relates to unbalanced voltage compensation, and more particularly, it relates to a method and a compensator for compensating for unbalance of three-phase AC (alternating current), and a control method and a controller for compensating for the unbalance of three-phase AC in a three-phase converter which converts three-phase AC power into DC (direct current) power.

2. Description of the Related Art

It is known that occurrence of voltage reduction on the power source side, such as instantaneous voltage drop (voltage sag) and a long-term voltage reduction, has an impact on the load side which receives power supply from the power source, such as production line stop and defects in manufactured goods. In particular, since it has a significant impact on semiconductor manufacturing equipment, standards are established regarding the voltage sag; "SEMI F47-0200" (non-patent document 1), and "SEMI F47-0706" (non-patent document 2). As for a testing method, it is described in "SEMI F42-0600".

Conventionally, this type of voltage sag has been addressed, for example, by installing an electric storage device such as a voltage sag compensator and an uninterruptible power supply (UPS), which employ a capacitor and a storage battery. The compensator using the electric storage device may have a configuration to be installed as a parallel device either on the power source side or on the load side. Alternatively, it may be installed as a serial device, being inserted between the power source side and the load side, with a configuration that the power system is switched at the time of voltage sag.

It is also known that when a short interruption or instantaneous voltage drop occurs in the three-phase AC input voltages of the (AC-DC) power converter for converting the three-phase AC power into DC power, the power supply to the load is maintained by the voltage sag compensator (for example, see patent document 1 and patent document 2).

FIG. 16 illustrates a configuration example of a conventional voltage fluctuation compensator 102. FIG. 16 illustrates a three-phase AC power source 101 in the form of wye connection having AC power sources 101a, 101b, and 101c for respective phases. However, in the conventional system using the electric storage device, it does not matter which connection is employed, the wye connection or delta connection. The voltage fluctuation compensator 102 is installed between the three-phase AC power source 101 and a DC load (not illustrated). It is to be noted here that the three-phase AC power source with the electric storage device is applicable to any of the wye connection and the delta connection.

In the voltage fluctuation compensator 102, as to the phases for the three-phase AC (a-phase, b-phase, and c-phase), the voltage compensation circuits 104a, 104b, and 104c for respective phases are serially connected, those voltage compensation circuits respectively being provided with capacitors 105a, 105b, and 105c as energy storage means, and a control circuit 103 is provided for controlling the voltage compensation circuits 104a, 104b, and 104c for the respective phases.

The three-phase AC power source is connected not only to three-phase equivalent loads, but also to various single-phase loads. Application of such various loads or influences such as weather phenomenon and accident phenomenon may cause a voltage sag in the state where the three phases are balanced or unbalanced.

The voltage compensation circuits 104a, 104b, and 104c for the respective phases, output compensating voltages for the respective phases based on a command from the control circuit 103, and compensate for the voltage fluctuations. The voltage fluctuation compensator 102 recharges the capacitors 105a, 105b, and 105c during the normal operation. In the event of short interruption or instantaneous voltage drop, the electric power discharged from the capacitors 105a, 105b, and 105c keeps a constant output voltage, thereby continuing power supply to the DC load.

There are following problems in the voltage sag compensator as described above, i.e., not only this system requires equipment investment for installing a large-sized electric storage device or a capacitor unit, but also periodic maintenance is necessary. Therefore, it has been demanded that power is supplied stably by means of converting the three-phase AC input power, even at the time of instantaneous voltage drop, without using the electric storage device. There has been also a demand for a power factor improvement without using the electric storage device.

In order to address the problems above, followings are suggested; considering that in the event of the instantaneous voltage drop, the input voltages during the voltage sag become unbalanced in the three phases, a three-phase PWM converter is employed to compensate for the voltage sag, by controlling the three-phase unbalanced input voltages during the voltage sag period, so as to achieve the voltage sag compensation without using the voltage fluctuation compensator employing the storage device. According to the voltage sag compensation by using the three-phase PWM converter, the electric power having been supplied in the normal state before the voltage sag state can be supplied continuously, even after the occurrence of the voltage sag.

Hereinafter, an explanation will be made how the three-phase PWM converter controls the three-phase unbalanced input voltages.

FIG. 17 illustrates an equivalent circuit in the event of voltage sag. In FIG. 17, $e_r$, $e_s$, and $e_t$ represent transmission line voltages balanced in three phases, $Z_1$ represents a transmission line impedance, $Z_{12}$, $Z_{23}$, and $Z_{31}$ are equivalent impedances at the time of voltage sag, $e_{ab}$, $e_{bc}$, and $e_{ca}$ represent line voltages unbalanced in three phases generated at the time of voltage sag, $e_{1o}$ represents a zero-phase-sequence voltage, and $Z_a$, $Z_b$, and $Z_c$ represent load impedance, which is expressed in the form of load impedance obtained by converting the DC load $R_{dc}$ (shown in FIG. 18) to the three-phase AC input side.

When the amplitude is assumed as $E_m$, the transmission line voltages balanced in three phases $e_r$, $e_s$, and $e_t$ are respectively expressed by the following formulas (1) to (3):

$$e_r = E_m \cos \omega t \qquad (1)$$

$$e_s = E_m \cos(\omega t - 2\pi/3) \qquad (2)$$

$$e_t = E_m \cos(\omega t + 2\pi/3) \qquad (3)$$

Since $e_r$, $e_s$, and $e_t$ represent the transmission line voltages balanced in three phases, negative-phase-sequence component $e_{n(rst)}$ and zero-phase-sequence component $e_{o(rst)}$ do not appear. Therefore, the negative-phase-sequence component $e_{n(rst)}$ and the zero-phase-sequence component $e_{o(rst)}$ are expressed by the following formula (4):

$$e_{n(rst)} = e_{o(rst)} = 0$$

In the example of FIG. 17, the state where the voltage sag is occurring corresponds to the state that the equivalent impedances $Z_{12}$, $Z_{23}$, and $Z_{31}$ are applied on the transmission line impedance $Z_1$. On this occasion, the line voltages $e_{ab}$, $e_{bc}$, and $e_{ca}$ go into the three-phase unbalanced state, and cause the zero-phase-sequence voltage $e_{10}$ as shown in FIG. 17.

As shown in FIG. 18, with respect to the terminals a, b, and c in FIG. 17, the left side illustrates the three-phase AC power source 100B, and the right side illustrates a main circuit unit of the three-phase converter 200. The three-phase AC power source 100B is illustrated in such a manner as being equivalent to the three-phase balanced voltages $e_r$, $e_s$, and $e_t$, and unbalanced factors. In this illustration, application of the impedances $Z_{12}$, $Z_{23}$, and $Z_{31}$ as shown in FIG. 17 expresses the unbalanced factors in equivalent manner.

An unbalanced voltage compensator 400 uses given or measurable three-phase unbalanced input phase voltages to generate compensation signal. The three-phase PWM converter 200 is provided with a three-phase PWM circuit 200a and a three-phase PWM control pulse generator 200b. The three-phase PWM control pulse generator 200b generates control pulse signals based on the three-phase unbalanced input voltages generated in the unbalanced voltage compensator 400, thereby exercising the PWM control over the three-phase PWM circuit 200a. According to the PWM control, the three-phase PWM converter 200 supplies to the DC load 300, the DC voltage to which the unbalanced voltage compensation has been performed.

As described above, the three-phase unbalanced input voltages during the voltage sag are controlled by the three-phase PWM converter, and the compensation for the voltage sag can be achieved without using the voltage fluctuation compensator employing the electric storage device such as a capacitor or a storage battery.

However, in general, in order to control the three-phase PWM converter in which PFC (Power Factor Correction) is incorporated, it is necessary to derive wye-connection three-phase unbalanced phase voltages which are 120° out of phase with each other. After the process for converting derived detection signals into variables on a rotating coordinate system (dq-axis), they are separated into a positive-phase-sequence voltage, a negative-phase-sequence voltage, and a zero-phase-sequence voltage, and they are used as feedback signals which are necessary for the control.

For example, the following non-patent documents 3 to 5 are known as describing the voltage sag compensation according to the three-phase PWM converter control.

In the three-phase PWM converter control described in those non-patent documents, three-phase unbalanced voltages of wye-connection, which are 120° out of phase with each other, are assumed as given or measurable input phase voltages.

On the other hand, a general three-phase power distribution system employs delta connection. In the three-phase power distribution with delta connection, the three-phase voltage which can be actually measured is a line voltage between the terminals, and the wye-connection voltage and the zero-phase-sequence voltage are unmeasurable.

Therefore, in order to compensate for the three-phase unbalanced voltages in the three-phase power distribution being the delta connection, by the three-phase PWM converter control which has been conventionally suggested, it is necessary to derive from the line voltages being measured, three-phase unbalanced phase voltages being the wye-connection, which are 120° out of phase with each other.

As described above, with the control of the three-phase unbalanced input voltages during the voltage sag by using the three-phase PWM converter, it is possible to achieve the voltage sag compensation without using the voltage fluctuation compensator which employs an electric storage device such as a capacitor or a storage battery.

However, in general, in order to control the three-phase PWM converter which incorporates the PFC (Power Factor Correction), it is necessary to derive the three-phase unbalanced phase voltages being wye-connection, which are 120° out of phase with each other. Detection signals being derived are subjected to conversion process to be converted into variables on the rotating coordinate system (dq-axis), and thereafter, these signals are separated into a positive-phase-sequence voltage, negative-phase-sequence voltage, and zero-phase-sequence voltage, so as to be used as feedback signals which are required for the control.

The non-patent documents 3 to 5 are known as disclosing the voltage-sag compensation by the three-phase PWM converter control, by way of example. However, the three-phase PWM converter control described in these documents assumes that the three-phase unbalanced voltages being wye-connection which are 120° out of phase with each other are given or measurable input phase voltages.

On the other hand, a general three-phase power distribution system employs the delta connection. A voltage that can be measured is a delta-connection three-phase voltage, and it is a line voltage between each of the terminals of the delta connection. Therefore, a wye-connection voltage and a zero-phase-sequence voltage are actually unmeasurable. Consequently, in order to compensate for the three-phase unbalanced voltages in the delta-connection three-phase power distribution, by the three-phase PWM converter control conventionally suggested, it is necessary to derive wye-connection three-phase unbalanced phase voltages which are 120° out of phase with each other, from the line voltages being measured. When the voltage sag compensation is controlled by the three-phase PWM converter, it is necessary to convert delta-type voltages of the three-phase unbalanced voltages being received, into wye-type voltages, so as to obtain control parameters. In particular, it is significant to extract a zero-phase-sequence voltage.

For example, patent document 3 is known as disclosing an apparatus or a method for compensating for the instantaneous voltage drop by the control according to this three-phase PWM converter. The instantaneous voltage drop compensator as described in the patent document 3 is provided with a line phase voltage conversion means. The line phase voltage conversion means converts a line voltage signal being detected by a line voltage detection means into a phase voltage conversion signal, and generates a zero-phase-sequence voltage signal and a phase voltage signal from this phase voltage conversion signal.

The line phase voltage conversion means detects peak values of the phase voltage conversion signals ($v_r'$, $v_s'$, $v_t'$), calculates coefficients k1, k2, and k3 based on these three peak values, and generates the zero-phase-sequence voltage signal v0 ($=k1 \cdot v_r' + k2 \cdot v_s' + k3 \cdot v_t'$) and the phase voltage signals ($v_r$, $v_s$, $v_t$) based on the coefficients k1, k2, and k3 being calculated.

Patent document 1: Japanese Unexamined Patent Application Publication No. 2003-274559 (FIG. 1, paragraph [0018])
Patent document 2: Japanese Unexamined Patent Application Publication No. 2004-222447

Patent document 3: Japanese Unexamined Patent Application Publication No. 2008-141887 (paragraph [0043], from [0055] to [0059])

Non-Patent Document 1:

SEMI "SEMI F47-0200 Specification for Semiconductor Processing Equipment Voltage Sag Immunity", pp. 859-864, issued in September, 1999, as the first edition, and issued in February, 2000 (SEMI 1999, 2000) (SEMI 1999, 2001)

Non-Patent Document 2:

SEMI "SEMI F47-0706 Specification for Semiconductor Processing Equipment Voltage Sag Immunity", pp. 1-12, issued in September, 1999, as the first edition, and approved to be issued in May, 2006 (SEMI 1999, 2006)

Non-patent document 3: J. K. Kang, S. K. Sul, "Control of Unbalanced Voltage PWM Converter Using Instantaneous Ripple Power Feedback", Power Electronic Specialist Conference, PESC 97, PP. 503-508 (1997-5)

Non-patent document 4: H. S. Kim, H. S. Mok, G. H. Choe, D. S. Hyun, S. Y. Choe, "Design of Current Controller for 3-phase PWM Converter with Unbalanced Input Voltage", Power Electronics Specialist Conference, PESC 98, pp. 503-509 (1988-8)

Non-patent document 5: S. C. Ahn, D. S. Hyun, "New Control Scheme of Three-Phase PWM AC/DC Converter Without Phase Angle Detection Under the Unbalanced Input Voltage Conditions", IEEE Transaction on Power electronics, pp. 616-622 (2009-9)

According to the patent document 3, the line phase voltage conversion means converts the line voltage signals being measured, into phase voltage conversion signals, and generates a zero-phase-sequence voltage signal and phase voltage signals based on the phase voltage conversion signals. Accordingly, it is possible to control the three-phase PWM converter based on the three-phase unbalanced voltages (line voltages) of the general three-phase power distribution system, and the three-phase unbalance compensation can be performed.

However, this line phase voltage conversion means detects peak values of the phase voltage conversion signals obtained by converting the line voltages, and generates the zero-phase-sequence voltage signal and the phase voltage signals according to the coefficients calculated based on these three peak values. Therefore, in order to generate the zero-phase-sequence voltage signal and the phase voltage signals, it is necessary to repeat measuring the line voltages more than once, so as to obtain the coefficients being optimum, and there is a possibility that a longer time may be taken to generate the signals.

If unbalanced voltages and phase angles of the wye-phase voltages are given, the line voltages being unbalanced can be determined from those wye-phase voltages according to a standardized manner. On the other hand, even though the unbalanced voltages and the phase angles of the line voltages are known, the wye-phase voltages cannot be determined according to a standardized manner from these line voltages. This is because a reference point of the wye-phase voltages cannot be specified, and there is infinite number of combinations of wye-phase voltages having the same unbalanced voltages and phase angles.

In order to control the three-phase PWM converter, it is necessary to have a relationship of 120° out of phase between the wye-phase voltages. Therefore, specific wye-phase voltages which are 120° out of phase with each other have to be selected from the infinite number of combinations of wye-phase voltages. When these specific wye-phase voltages which are 120° out of phase with each other are selected, a positive-phase-sequence voltage becomes in phase with a particular phase (a-phase) of the wye-phase voltages, and a DC component as a control target can be extracted according to the subsequent dq-axis conversion process. Therefore, it is convenient for the control of the three-phase PWM converter. In addition, a phase angle of the negative-phase-sequence voltage and a phase angle of the zero-phase-sequence voltage with respect to the positive-phase-sequence voltage, indicate the same angle in the direction opposite to each other, therefore enabling the zero-phase-sequence voltage to be derived.

Conventionally, in order to obtain from the line voltages, the wye-phase voltages which are 120° out of phase with each other, it is necessary to detect the unbalanced state of voltages and further to select the wye-phase voltages which are 120° out of phase with each other, from the line voltages being measured. Therefore, it may take a longer processing time. By way of example, when the unbalanced state of voltages is detected in alternating current, it is necessary to monitor voltage fluctuations during at least ½ cycle.

In order to quickly compensate for the voltage unbalance by controlling the three-phase PWM converter, it is requested to reduce the time required for detecting the unbalance in voltages and generating a control signal, and thus it is necessary to derive instantaneous wye-phase voltages from instantaneous line voltages. It is to be noted here that the instantaneous line voltages are line voltages measured at a certain point of time, and the instantaneous wye-phase voltages are values of the line voltages derived based on the actual measured values of the line voltages being obtained at this point of time. These wye-phase values correspond one-to-one with one point for measuring the line voltages, and this means that the wye-phase voltages can be obtained from values measured at one measuring point of time, without requiring measured values at multiple points.

In order to quickly eliminate an influence caused by the instantaneous voltage drop on the load side, it is necessary to immediately generate the zero-phase-sequence voltage signal and the phase voltage signals which are required for controlling the three-phase PWM converter, in response to the fluctuation of the unbalanced state of the three-phase line voltages in the three-phase power distribution system. In the line phase voltage conversion means described above, it is expected that actual measurement of the line voltages is repeated more than once in order to generate the zero-phase-sequence voltage signal and the phase voltage signals. Therefore, there is a possibility that the response to the fluctuations in the unbalanced state of the three-phase line voltages may be insufficient.

As a response to the instantaneous voltage drop, the specification for voltage sag immunity SEMI F47-0200 is known, for instance. The specification for voltage sag immunity SEMI F47-0200 defines a range in a wide band (a range of input voltage reduction from 0% to 100%) to be controlled by the voltage sag compensation. In this voltage sag immunity specification, it is defined that the voltage reduction rate within 0.2 seconds from the occurrence of voltage sag is down to 50%, and the voltage reduction rate from 0.2 seconds to 0.5 seconds is down to 70%, and the like.

If the response to the instantaneous voltage drop is insufficient, it is difficult to satisfy this specification voltage sag immunity.

Conventionally, the following technique has not been known; i.e., using the three-phase unbalanced voltages of line voltages as the input voltage, instantaneous wye-phase voltages are derived from the instantaneous line voltages, thereby controlling the three-phase PWM converter and compensating for the unbalanced voltages.

An object of the present invention is to solve the conventional problems, and to derive instantaneous values of wye-phase voltages of the wye-connection which are 120° out of phase with each other, from the instantaneous values of the line voltages, in order to compensate for the unbalanced voltages of three-phase AC. That is, the instantaneous wye-phase voltages are derived from the instantaneous line voltages, thereby controlling the three-phase PWM converter to compensate for the unbalanced voltages.

More specifically, an object of the present invention is to derive a positive-phase-sequence voltage, a negative-phase-sequence voltage, and a zero-phase-sequence voltage, which are three-phase unbalanced voltages of wye-connection being 120° out of phase with each other at the time of actual measurement, from actual measured values of the line voltages, at one actual measurement point, being the three-phase unbalanced voltages which are generated in delta connection. That is, the object is to the three-phase unbalanced voltages of wye-connection which are 120° out of phase with each other, from actual measured values of the line voltages at one actual measurement point, thereby controlling the three-phase PWM converter to compensate for the unbalanced voltages.

Here, the instantaneous values of line voltages are values of the line voltages actually measured at a certain point of time, and the instantaneous values of wye-phase voltages are values of the wye-phase voltages being derived based on the actual measured values of the line voltages.

SUMMARY OF THE INVENTION

The present invention is directed to using line voltages actually measured at a certain point of time, without using actual measurement values obtained at multiple measuring points, to derive the wye-phase voltages obtained at the measuring point of time, and controlling a three-phase PWM converter by using the wye-phase voltages being derived, so as to compensate for unbalanced voltages.

FIG. 1 is a schematic diagram to explain the unbalanced voltage compensation according to the present invention. The present invention is directed to the compensation of the unbalanced voltages by using the line voltages at the terminals a, b, and c, in the case where the three-phase unbalanced voltages $e_{1a}$, $e_{1b}$, and $e_{1c}$ are not given or not directly measurable, and it is further directed to obtaining instantaneous values of the wye-phase voltages of wye-connection which are 120° out of phase with each other, by using the line voltages actually measured at one point of time, thereby performing the unbalance compensation.

In FIG. 17, in association with the respective terminals a, b, and c, the three-phase AC power source 100B side is illustrated as an equivalent circuit incorporating balanced voltages $e_r$, $e_s$, and $e_t$, a transmission impedance $Z_1$, and equivalent impedances $Z_{12}$, $Z_{23}$, and $Z_{31}$ in the event of voltage sag. Conventionally, as shown in FIG. 18, it is assumed that the unbalanced state of this three-phase AC power source 100B is caused by unbalancing factors against the balanced voltages $e_r$, $e_s$, and $e_t$. Therefore, the unbalanced voltage compensator 400 is capable of compensating for the three-phase unbalanced voltages under the condition that the three-phase unbalanced voltages $e_{1a}$, $e_{1b}$, and $e_{1c}$, are given or measurable. However, if these three-phase unbalanced voltages $e_{1a}$, $e_{1b}$, and $e_{1c}$ are unknown or unmeasurable, the unbalanced voltage compensation cannot be performed.

As against the conventional way to handle the unbalanced state as described above, the three-phase AC power source 100A as shown in FIG. 1 includes unbalanced voltages $e_{1a}$, $e_{1b}$, and $e_{1c}$, each with the phase angle of $2\pi/3$, and it is possible to assume that those unbalanced voltages induce the induced voltages $e_{ab}$, $e_{bc}$, and $e_{ca}$, respectively on the terminals a, b, and c. Accordingly, the induced voltages $e_{ab}$, $e_{bc}$, and $e_{ca}$ can be treated as voltages generated from the three-phase unbalanced voltages $e_{1a}$, $e_{1b}$, and $e_{1c}$ in the three-phase AC power source 100A. In other words, these induced voltages can be assumed as making up for acquisition of the unbalanced voltages $e_{1a}$, $e_{1b}$, and $e_{1c}$ when those unbalanced voltages cannot be directly obtained.

According to the aforementioned overview for handling the unbalanced state of the present invention, even when the three-phase unbalanced voltages $e_{1a}$, $e_{1b}$, and $e_{1c}$ are not given or unmeasurable, it is possible to obtain the three-phase unbalanced voltages $e_{1a}$, $e_{1b}$, and $e_{1c}$ by using the induced voltages $e_{ab}$, $e_{bc}$, and $e_{ca}$, thereby compensating for the unbalanced voltages. Here, the induced voltages $e_{ab}$, $e_{bc}$, and $e_{ca}$ correspond to the line voltages of the terminals a, b, and c, respectively.

The present invention is directed to a technique for deriving from the instantaneous values of the line values, instantaneous values of wye-phase voltages of wye-connection which are 120° out of phase with each other, thereby controlling the three-phase PWM converter to compensate for the unbalanced voltages, and even in the case where the three-phase unbalanced input voltages are not given or unmeasurable, it is possible to perform the unbalanced voltage compensation.

The present invention focuses attention on that input voltages in a general three-phase power distribution system are based on the delta-type connection (line voltages) instead of wye-type connection (wye-phase voltages), and by subjecting the line voltages to the vector operation, instantaneous values of the wye-phase voltages which are 120° out of phase with each other and the zero-phase-sequence voltage are derived. In order to control the three-phase converter, it is necessary to derive the wye-phase voltages and the zero-phase-sequence voltage. In the present invention, the wye-phase voltages obtained by the vector operation is subjected to the dq-axis conversion process, and a DC component of the positive-phase-sequence is extracted to be used as a feedback signal to control the three-phase converter.

The present invention is intended for the line voltages of three-phase unbalance in a general three-phase power distribution system, and according to a method for converting the line voltages into the wye-phase voltages by using a centroid vector operation, instantaneous values of the three-phase unbalanced voltages of wye-phase voltages which are 120° out of phase with each other and the zero-phase-sequence voltage are derived from the instantaneous values of three-phase unbalanced voltages being the line voltages.

The present invention includes following embodiments; an unbalanced voltage compensation method, an unbalanced voltage compensator, a method for controlling three-phase converter, a controller of three-phase converter, and a program for compensating for unbalanced voltages. Any of the embodiments above are commonly provided with technical elements; the centroid vector operation, symmetrical component calculation, and unbalanced voltage compensation.

The first embodiment of the present invention relates to the unbalanced voltage compensation method, and specifically, it relates to a method for compensating for the unbalance in the three-phase AC input voltages, in a power conversion which subjects the three-phase AC voltages to the PWM conversion and outputs DC voltage.

The unbalanced voltage compensation method according to the present invention includes, in the power conversion for subjecting the three-phase AC voltages to the PWM conversion and outputting the DC voltage, a centroid vector operation step for obtaining from line voltages, wye-phase voltages which are 120° out of phase with each other, a symmetrical component calculation step for calculating symmetrical component voltages of a three-phase balanced system, from the wye-phase voltages that are obtained by the centroid vector operation step, and an unbalanced voltage compensation step for forming a compensation signal for compensating for unbalanced voltages of three-phase AC voltages, and subjecting the three-phase AC voltages to the PWM conversion to generate a control signal for outputting the DC voltage.

In the centroid vector operation step of the present invention, the vector operation is performed as to all combinations of two line voltages which are selected from the three-phase line voltages. According to this vector operation, centroid vector voltages are obtained which are directed to the respective terminal voltages from the terminal-voltage centroid of delta voltages being the three-phase line voltages. Then, the vector voltages being obtained are respectively rendered as the wye-phase voltages which are 120° out of phase with each other.

The inventors of the present invention have found the following; in a triangle whose vertices form the terminal voltages of respective phases in the three-phase AC voltages, when centroid vectors are obtained as to each line voltage vector connecting two terminals according to the centroid vector operation step of the present invention, the centroid of these centroid vectors agrees with a reference point of the zero-phase-sequence component of each of the wye-phase voltages which are 120° out of phase with each other.

The centroid vector voltages obtained from the line voltages include a positive-phase-sequence component and a negative-phase-sequence component of the symmetrical component voltages though they do not include the zero-phase-sequence component. Therefore, according to the relationship in which the centroid of the centroid vectors agrees with the reference point of the zero-phase-sequence component, it is possible to treat the centroid vector voltages as the wye-phase voltages which are 120° out of phase with each other according to the dq-axis conversion process.

In the symmetrical component calculation step, each of the wye-phase voltages obtained in the centroid vector operation step is subjected to the dq-axis conversion, calculates a d-axis voltage signal and q-axis voltage signal, subjects the d-axis voltage signal and the q-axis voltage signal being calculated to frequency separation, obtains a positive-phase-sequence voltage from a DC component, and calculates a negative-phase-sequence voltage from an AC component.

Since the wye-phase voltages obtained in the centroid vector operation step do not include the zero-phase-sequence component, the zero-phase-sequence voltage is calculated by using amplitude calculated from the negative-phase-sequence voltage and a phase calculated from the positive-phase-sequence voltage and the negative-phase-sequence voltage, in order to calculate the zero-phase-sequence voltage in the symmetrical calculation step.

The unbalanced voltage compensation step generates a compensation signal for compensating for the unbalanced voltages of the three-phase line voltages based on the zero-phase-sequence voltage of the symmetrical component voltages which are obtained in the symmetrical component calculation step, obtains wye-phase voltages based on the symmetrical component voltages and the compensation signal, the wye-phase voltages being 120° out of phase with each other as to which the unbalanced voltages have been compensated for, and subjects the three-phase AC voltages to the PWM conversion based on these obtained wye-phase voltages to generate the control signal for outputting the DC voltage.

Actual measurement values of the line voltages correspond one-to-one with the control signal, and one control signal is generated based on the actual measurement values of the line voltages which are obtained at one measurement point of time.

According to the present invention, the compensation signal and the control signal for performing the unbalance compensation may be obtained based on the line voltages in the three-phase AC voltages, those line voltages being values measured at one point of time. Therefore, the measurement at multiple points, conventionally performed, is not necessary to obtain the signals.

Therefore, it is possible to save the time for preparing measurement data to form the compensation signal and the control signal for performing the unbalance compensation, and these signals can be generated from the measurement data only at one measurement point of time. Seen in this light, it is possible to generate the compensation signal and control signal, which are instantaneous.

The second embodiment of the present invention relates to an unbalanced voltage compensator, and more particularly, it relates to a compensator which compensates for the unbalance in the three-phase AC input voltages, in the power conversion by subjecting the three-phase AC voltages to the PWM conversion to output DC voltage.

In the power conversion by subjecting the three-phase AC voltages to the PWM conversion to output the DC voltage, the unbalanced voltage compensator of the present invention is provided with a centroid vector operation unit for obtaining from line voltages, wye-phase voltages which are 120° out of phase with each other, a symmetrical component calculation unit for calculating symmetrical component voltages of a three-phase balanced system, from the wye-phase voltages obtained in the centroid vector operation unit, and an unbalanced voltage compensation unit for forming a compensation signal to compensate for unbalanced voltages of the three-phase AC voltages, and subjecting the three-phase AC voltages to the PWM conversion to generate a control signal for outputting the DC voltage.

The centroid vector operation unit of the present invention performs the vector operation as to all combinations of two line voltages which are selected from the three-phase line voltages. According to this vector operation, centroid vector voltages are obtained which are directed to respective terminal voltages from the terminal-voltage centroid of delta voltages being the three-phase line voltages. The vector voltages being obtained are respectively rendered as the wye-phase voltages which are 120° out of phase with each other, and then outputted.

The unbalanced voltage compensation unit of the present invention generates and outputs a compensation signal for compensating for the unbalanced voltages of three-phase AC voltages based on the zero-phase-sequence voltage of the symmetrical component voltages which are obtained in the symmetrical component calculation unit, obtains wye-phase voltages based on the symmetrical component voltages and the compensation signal, the wye-phase voltages being 120° out of phase with each other as to which the unbalanced voltages have been compensated for, and subjects the three-phase AC voltages to the PWM conversion based on the obtained wye-phase voltages to generate the control signal for outputting the DC voltage.

The symmetrical component calculation unit of the present invention calculates a d-axis voltage signal and a q-axis voltage signal by subjecting each of the wye-phase voltages obtained in the centroid vector operation unit to the dq-axis conversion, subjects the d-axis voltage signal and the q-axis voltage signal being calculated to frequency separation, obtains a positive-phase-sequence voltage from a DC component, and calculates a negative-phase-sequence voltage from an AC component, then outputting those voltages to the unbalanced voltage compensation unit.

The symmetrical component calculation unit of the present invention calculates a zero-phase-sequence voltage, based on amplitude calculated from the negative-phase-sequence voltage and a phase calculated from the positive-phase-sequence voltage and the negative-phase-sequence voltage, and outputs the zero-phase-sequence voltage to the unbalanced voltage compensation unit.

The unbalanced voltage compensation unit of the present invention generates one control signal for the actual measured values of the line voltages at one measurement point of time.

Technical matters relating to the unbalanced voltage compensation of the present invention can be applied to a control of the three-phase converter which subjects the three-phase AC voltages to the PWM conversion to output DC voltage.

The third embodiment of the present invention is directed to a method for controlling the three-phase converter, and the fourth embodiment of the present invention is directed to a controller of the three-phase converter.

A method for controlling the three-phase converter according to the third embodiment of the present invention includes, in subjecting three-phase AC voltages to the PWM conversion to output DC voltage, similar to the unbalanced voltage compensation method according to the first embodiment, a centroid vector operation step for obtaining from line voltages, wye-phase voltages which are 120° out of phase with each other, a symmetrical component calculation step for calculating symmetrical component voltages of a three-phase balanced system from the wye-phase voltages obtained in the centroid vector operation step, and an unbalanced voltage compensation step for forming a compensation signal to compensate for unbalanced voltages in the three-phase AC voltages and subjecting the three-phase AC voltages to the PWM conversion to generate a control signal for outputting the DC voltage.

In the centroid vector operation step, the vector operation is performed as to all combinations of two line voltages which are selected from the three-phase line voltages. According to this vector operation, centroid vector voltages are obtained which are directed to respective terminal voltages from the terminal-voltage centroid of delta voltages being the three-phase line voltages. Then, the vector voltages being obtained are respectively rendered to be the wye-phase voltages which are 120° out of phase with each other.

The unbalanced voltage compensation step generates a compensation signal for compensating for the unbalanced voltages of three-phase AC voltages based on the zero-phase-sequence voltage of the symmetrical component voltages which are obtained in the symmetrical component calculation step, obtains wye-phase voltages based on the symmetrical component voltages and the compensation signal, the wye-phase voltages being 120° out of phase with each other as to which the unbalanced voltages have been compensated for, subjects the three-phase AC voltages to the PWM conversion based on the obtained wye-phase voltages to generate a control signal for outputting DC voltage, and the control signal generated by the unbalanced voltage compensation step controls a switching operation of the three-phase converter to subject the three-phase AC voltages to the PWM conversion and output the DC voltage.

In the symmetrical component calculation step, each of the wye-phase voltages obtained in the centroid vector operation step is subjected to the dq-axis conversion to calculate a d-axis voltage signal and a q-axis voltage signal, the calculated d-axis and q-axis voltage signals are subjected to frequency separation, and a positive-phase-sequence voltage is obtained from a DC component and a negative-phase-sequence voltage is obtained from an AC component.

In the symmetrical component calculation step, a zero-phase-sequence voltage is calculated based on amplitude calculated from the negative-phase-sequence voltage and a phase calculated from the positive-phase-sequence voltage and the negative-phase-sequence voltage. Actual measurement values of the line voltages corresponds one-to-one with the control signal, and one control signal is generated based on the actual measurement values of the line voltages at one measurement point of time.

The controller of the three-phase converter according to the fourth embodiment of the present invention includes, in controlling the three-phase converter to subject three-phase AC voltages to the PWM conversion to output DC voltage, similar to the unbalanced voltage compensator of the second embodiment, a centroid vector operation unit for obtaining from line voltages, wye-phase voltages which are 120° out of phase with each other, a symmetrical component calculation unit for calculating symmetrical component voltages of a three-phase balanced system, from the wye-phase voltages obtained in the centroid vector operation unit, and an unbalanced voltage compensation unit for forming a compensation signal to compensate for unbalanced voltages of the three-phase AC voltages, and subjecting the three-phase AC voltages to the PWM conversion to generate a control signal for outputting the DC voltage.

The centroid vector operation unit of the present invention performs the vector operation as to all combinations of two line voltages which are selected from the three-phase line voltages. According to this vector operation, centroid vector voltages are obtained which are directed to respective terminal voltages from the terminal-voltage centroid of delta voltages being the three-phase line voltages. Then, the vector voltages being obtained are respectively rendered as the wye-phase voltages which are 120° out of phase with each other, and then outputted.

The unbalanced voltage compensation unit of the present invention generates and outputs a compensation signal for compensating for the unbalanced voltages of three-phase AC voltages based on the zero-phase-sequence voltage of the symmetrical component voltages which are obtained in the symmetrical component calculation unit, obtains wye-phase voltages based on the symmetrical component voltages and the compensation signal, the wye-phase voltages being 120° out of phase with each other as to which the unbalanced voltages have been compensated for, subjects the three-phase AC voltages to the PWM conversion based on the obtained wye-phase voltages to generate a control signal for outputting DC voltage, and the control signal generated by the unbalanced voltage compensation unit controls a switching operation of the three-phase converter to subject the three-phase AC voltages to the PWM conversion and output the DC voltage.

The symmetrical component calculation unit subjects each of the wye-phase voltages obtained in the centroid vector operation unit to the dq-axis conversion to calculate a d-axis voltage signal and a q-axis voltage signal, subjects the calculated d-axis and q-axis voltage signals to frequency separation, obtains a positive-phase-sequence voltage from a DC component and a negative-phase-sequence voltage from an AC component, then outputting the voltages to the unbalanced voltage compensation unit.

The symmetrical component calculation unit calculates the zero-phase-sequence voltage, based on amplitude calculated from the negative-phase-sequence voltage and a phase calculated from the positive-phase-sequence voltage and the negative-phase-sequence voltage, and outputs the zero-phase-sequence voltage to the unbalanced voltage compensation unit.

Actual measurement values of the line voltages correspond one-to-one with the control signal, and one control signal is generated based on the actual measurement values of the line voltages at one measurement point of time.

Another aspect of the present invention is directed to an unbalanced voltage compensation program. The unbalanced voltage compensation program of the present invention is a program to allow a computer to execute each of the following steps in controlling a three-phase converter, and in controlling the three-phase converter for subjecting three-phase AC voltages to the PWM conversion to output DC voltage, the program includes a centroid vector operation step for obtaining from line voltages, wye-phase voltages which are 120° out of phase with each other, a symmetrical component calculation step for calculating symmetrical component voltages of a three-phase balanced system from the wye-phase voltages obtained in the centroid vector operation step, and an unbalanced voltage compensation step for forming a compensation signal to compensate for unbalanced voltages of the three-phase AC voltages to generate a control signal which subjects the three-phase AC voltages to the PWM conversion for outputting DC voltage.

Here, the above steps may include, similar to the unbalanced voltage compensation method being the first embodiment of the present invention, a centroid vector operation step, a symmetrical component calculation step, and an unbalanced voltage compensation step.

In the centroid vector operation step, the vector operation is performed as to all combinations of two line voltages which are selected from the three-phase line voltages. According to this vector operation, centroid vector voltages are obtained which are directed to respective terminal voltages from the terminal-voltage centroid of delta voltages being the three-phase line voltages. Then, the vector voltages being obtained are respectively rendered to be the wye-phase voltages which are 120° out of phase with each other.

The unbalanced voltage compensation step generates a compensation signal for compensating for the unbalanced voltages of three-phase AC voltages based on the zero-phase-sequence voltage of the symmetrical component voltages which are obtained in the symmetrical component calculation step, obtains wye-phase voltages based on the symmetrical component voltages and the compensation signal, the wye-phase voltages being 120° out of phase with each other as to which the unbalanced voltages have been compensated for, and subjects the three-phase AC voltages to the PWM conversion based on the obtained wye-phase voltages to generate a control signal for outputting DC voltage.

In the symmetrical component calculation step of the present invention, each of the wye-phase voltages obtained in the centroid vector operation step is subjected to the dq-axis conversion to calculate a d-axis voltage signal and a q-axis voltage signal, the calculated d-axis and q-axis voltage signals are subjected to frequency separation, and a positive-phase-sequence voltage is obtained from a DC component and a negative-phase-sequence voltage is obtained from an AC component.

In the symmetrical component calculation step, a zero-phase-sequence voltage is calculated based on amplitude calculated from the negative-phase-sequence voltage and a phase calculated from the positive-phase-sequence voltage and the negative-phase-sequence voltage, and the zero-phase-sequence voltage is outputted to the unbalanced voltage compensation unit. Actual measurement values of the line voltages correspond one-to-one with the control signal, and one control signal is generated based on the actual measurement values of the line voltages at one measurement point of time.

According to the embodiments of the present invention, it is possible to use the line voltages actually measured at a certain point of time without using actual measurement values obtained at multiple measuring points, whereby the wye-phase voltages at the measuring point can be derived.

As the instantaneous values of wye-phase voltages 120° out of phase with each other are derived from the instantaneous values of line voltages, the amount of time to compensate the three-phase unbalanced voltages required for detecting an unbalance of voltages and generating a control signal can be shortened. This will allow a rated output retain and a three-phase balanced current output by a three-phase converter control without using an electric storage device, instantaneously without a time-delay.

EFFECT OF THE INVENTION

As described above, according to each of the embodiments of the present invention; the unbalanced voltage compensation method, the unbalanced voltage compensator, the three-phase converter control method, the controller of the three-phase converter, and the unbalanced voltage compensation program, it is possible to derive from the line voltages, instantaneous values of the wye-phase voltages of wye-connection which are 120° out of phase with each other, in performing the unbalanced voltage compensation in the three-phase AC.

According to the present invention, in performing the unbalanced voltage compensation in the three-phase AC, it is possible to derive from actual values of the line voltages at one actual measurement point of time, being the three-phase unbalanced voltages, the positive-phase-sequence voltage, the negative-phase-sequence voltage, and the zero-phase-sequence voltage, which are the three-phase unbalanced voltages of wye-connection being 120° out of phase with each other at the time of the actual measurement.

DESCRIPTION OF THE PREFERRED EMBODIMENTS

Hereinafter, preferred embodiments of the present invention will be explained in detail with reference to the accompanying drawings. With reference to FIG. 2 to FIG. 9, a configuration of the unbalanced voltage compensator of the present invention and an unbalanced voltage compensation method of the present invention will be explained, taking a three-phase converter as an example, and experimental results of the embodiments will be explained with reference to FIG. 10 to FIG. 15.

Figure 1:
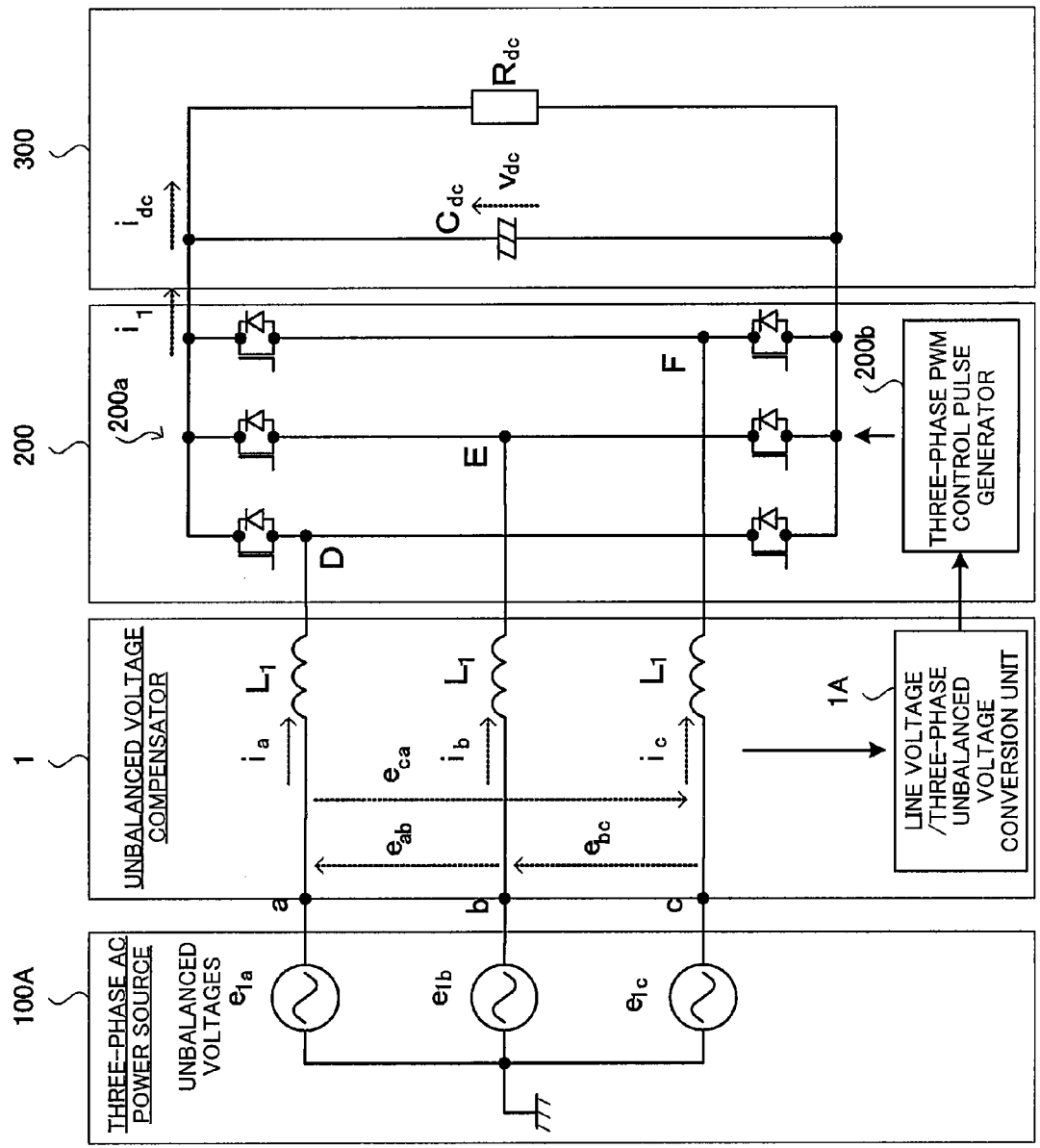
FIG. 1 is a schematic diagram to explain the unbalanced voltage compensation according to the present invention.
Figure 2:
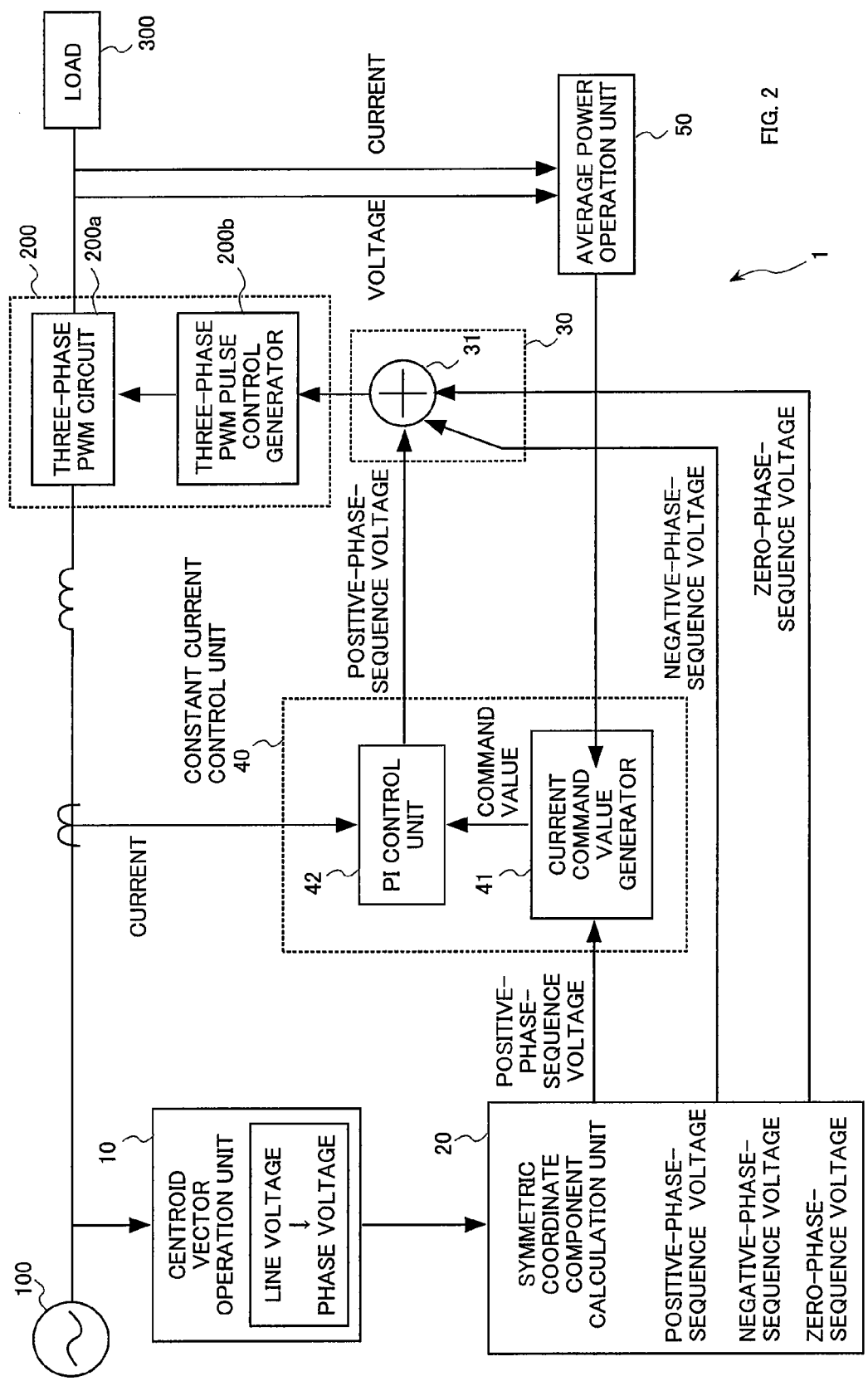
FIG. 2 illustrates a schematic configuration of the unbalanced voltage compensator according to the present invention.

With reference to FIG. 2, a schematic configuration of the unbalanced voltage compensator of the present invention will be explained. In FIG. 2, a three-phase AC power source 100 supplies three-phase AC power, and the three-phase converter 200 subjects the three-phase AC power to the PWM conversion to output DC voltage to the DC load 300.

The unbalanced voltage compensator 1 of the present invention compensates for unbalanced voltages in the three-phase AC power, and suppresses fluctuations of the voltage outputted to the DC load 300. In addition, the unbalanced voltage compensator 1 feedbacks the voltage and current inputted into the DC load 300 to perform a power factor control according to the PFC (Power Factor Correction) control.

The unbalanced voltage compensator 1 is provided with a centroid vector operation unit 10 to obtain from line voltages, wye-phase voltages which are 120° out of phase with each other, a symmetric coordinate component calculation unit 20 for calculating symmetrical component voltages of a three-phase balanced system, from the wye-phase voltages obtained by the centroid vector operation unit 10, and an adder 30 for forming a compensation signal for compensating for the unbalanced voltages in the three-phase AC voltages and subjecting the three-phase AC voltages to the PWM conversion to generate a control signal for outputting DC voltage.

The three-phase converter 200 is provided with a three-phase PWM circuit 200a and a three-phase PWM pulse generator 200b for controlling the operation of the three-phase PWM circuit 200a to generate pulse signals for performing the PWM control. The three-phase PWM pulse generator 200b forms the pulse signals based on the control signal generated in the adder 30. For example, the three-phase PWM circuit 200a may be formed by a bridged circuit which is made up of a switching element, and the pulse signals control ON/OFF operation of the switching element to perform the PWM control.

The centroid vector operation unit 10 performs the vector operation as to all combinations of two line voltages selected from the line voltages. According to the vector operation, centroid vector voltages are obtained, directed from the centroid of the terminal voltages of delta connection to the terminal voltages, respectively, and those obtained vector voltages are outputted to the symmetric coordinate component calculation unit 20, assuming these voltages as wye-phase voltages which are 120° out of phase with each other.

The symmetric coordinate component calculation unit 20 calculates from the wye-phase voltages obtained in the centroid vector operation unit 10, a positive-phase-sequence voltage, a negative-phase-sequence voltage, and a zero-phase-sequence voltage, which are symmetrical component voltages of the three-phase balanced system, and these voltages are outputted to the adder 30.

The unbalanced voltage compensation is made up of a constant current control unit 40 for performing constant current control by a constant current command value generator 41 generating a current command value based on the positive-phase-sequence voltage calculated in the symmetric coordinate component calculation unit 20 and the feedback value of the input power to the load side, and a PI control unit 42 for performing PI control based on the current command value and the input current into the three-phase converter 200, an average power operation unit 50 for performing the PFC control (power factor control) by the PI control, and the adder 30 for adding the positive-phase-sequence voltage after the constant current control is performed, the negative-phase-sequence voltage, and the zero-phase-sequence voltage. The zero-phase-sequence voltage is added as the compensation signal which compensates for the unbalanced voltages of three-phase AC voltages.

The adder 30 outputs the wye-phase voltages which are 120° out of phase with each other, as to which the unbalanced voltages have been compensated for. The wye-phase voltages outputted from the adder 30 are inputted into the three-phase PWM pulse generator 200b in the three-phase converter 200, serving as the control signal for subjecting the three-phase AC voltages to the PWM conversion to output DC voltage.

The input power to be given as a feedback to the constant current control unit 40 can be acquired in the average power operation unit 50, for example, by calculating power based on the current and the voltage being detected on the load side.

[Calculate Wye-Phase Voltages by the Centroid Vector Operation]

Figure 3:
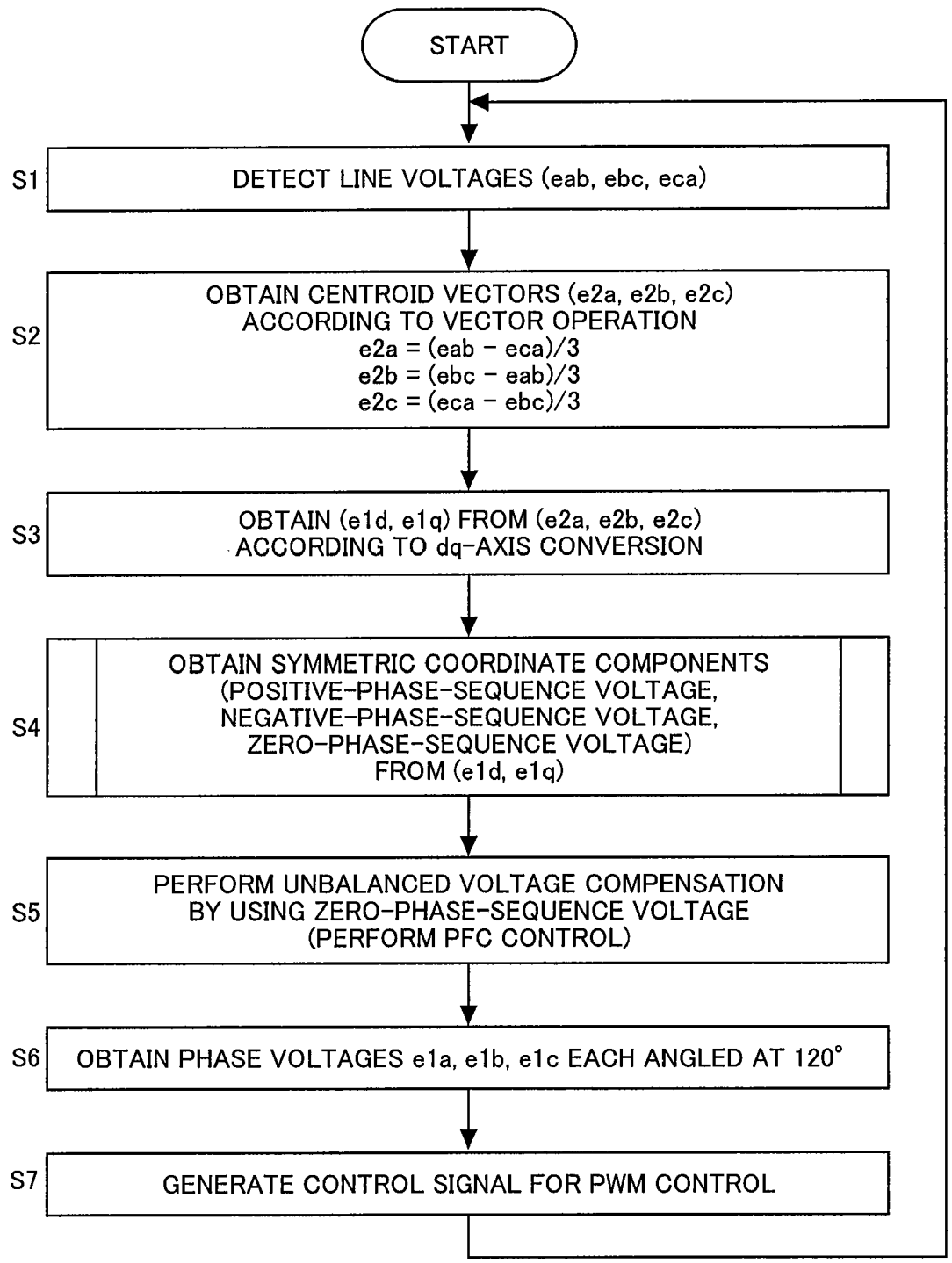
FIG. 3 is a flowchart to explain a procedure for obtaining wye-phase voltages from line voltages, according to the centroid vector operation in the unbalance compensation of the present invention.
Figure 4:
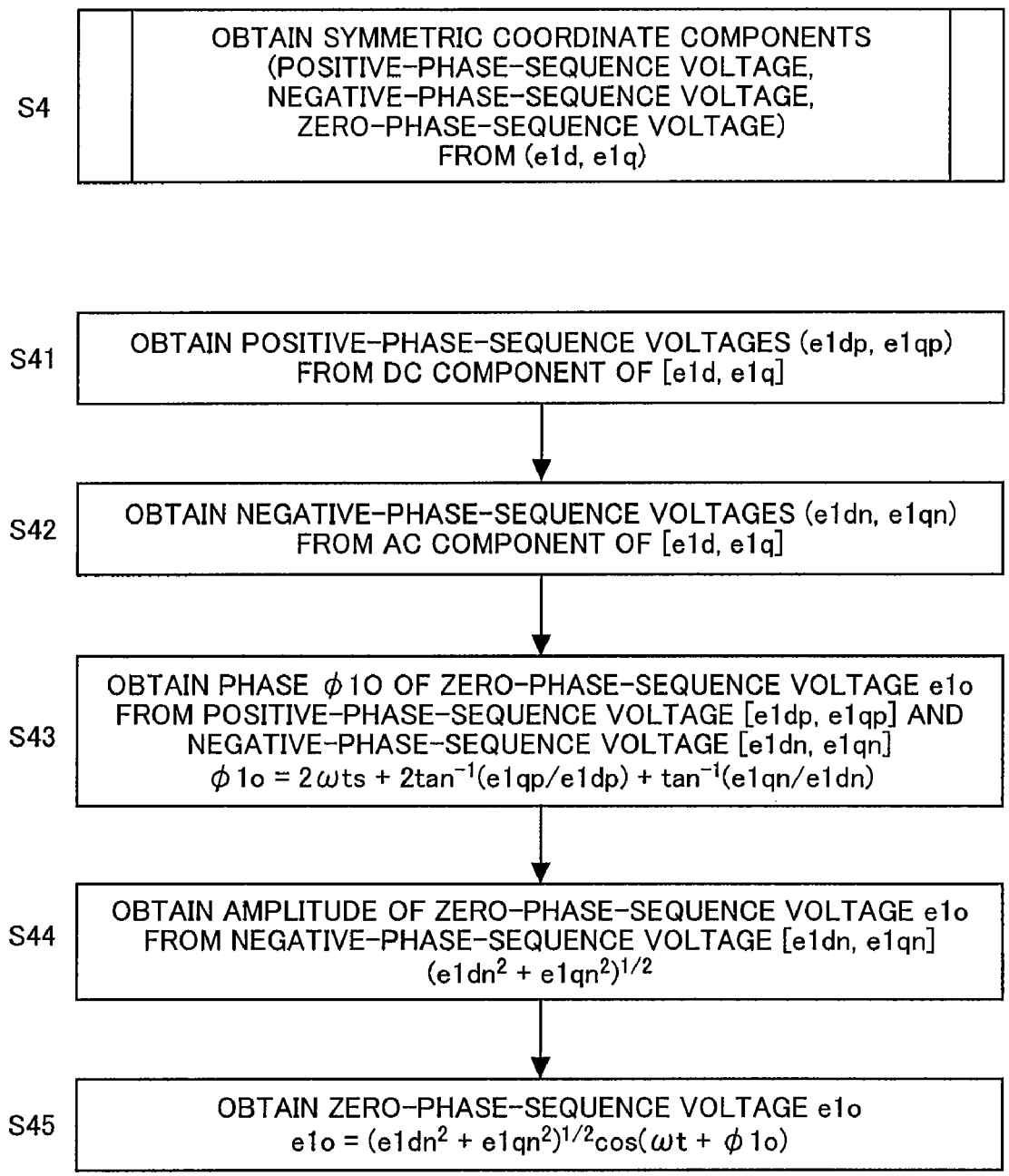
FIG. 4 is a flowchart to explain a procedure for calculating symmetrical voltages from the wye-phase voltages, according to the centroid vector operation in the unbalance compensation of the present invention.

Next, in the unbalance compensation of the present invention, with reference to the flowcharts in FIG. 3 and FIG. 4, and the vector diagrams in FIG. 5 and FIG. 6, there will be explained a procedure for obtaining the wye-phase voltages which are 120° out of phase with each other from the line voltages by using the centroid vector operation, and a procedure for calculating symmetrical component voltages from the wye-phase voltages being obtained.

The line voltages ($e_{ab}$, $e_{bc}$, $e_{ca}$) between each of the three-phase AC terminals are detected. Here, the line voltage $e_{ab}$ is a vector voltage between the terminal "a" and the terminal "b", the line voltage $e_{bc}$ is a vector voltage between the terminal "b" and the terminal "c", and the line voltage $e_{ca}$ is a vector voltage between the terminal "c" and the terminal "a" (S1).

The line voltages being detected ($e_{ab}$, $e_{bc}$, $e_{ca}$) are subjected to the vector operation, and centroid vectors ($e_{2a}$, $e_{2b}$, $e_{2c}$) are calculated.

$$e_{2a}=(e_{ab}-e_{ca})/3 \quad (5)$$

$$e_{2b}=(e_{bc}-e_{ab})/3 \quad (6)$$

$$e_{2c}=(e_{ca}-e_{bc})/3 \quad (7)$$

The inventors of the present invention have focused attention on that there is a relationship as expressed by the following formula (8) between the centroid vectors ($e_{2a}$, $e_{2b}$, $e_{2c}$) calculated from the line voltages, and the wye-phase vector voltages ($e_{1a}$, $e_{1b}$, $e_{1c}$) which are 120° out of phase with each other.

$$e_{1a}=e_{2a}+e_{1o}$$

$$e_{1b}=e_{2b}+e_{1o}$$

$$e_{1c}=e_{2c}+e_{1o}$$

The formula (8) expresses that the wye-phase voltages ($e_{1a}$, $e_{1b}$, $e_{1c}$) which are 120° out of phase with each other are represented by the vectorial sum of the centroid vectors of the line voltages ($e_{2a}$, $e_{2b}$, $e_{2c}$), respectively, and the zero-phase-sequence voltage $e_{1o}$. According to the formula (8), the inventors of the present invention have found that it is possible to obtain the wye-phase voltages ($e_{1a}$, $e_{1b}$, $e_{1c}$) which are 120° out of phase with each other, from the centroid vectors of the line voltages ($e_{2a}$, $e_{2b}$, $e_{2c}$) by deriving the zero-phase-sequence voltage $e_{1o}$. Further, it is also found that according to this relationship, the positive-phase-sequence voltage $e_{1p}$ and the negative-phase-sequence voltage $e_{1n}$ of the wye-phase voltages ($e_{1a}$, $e_{1b}$, $e_{1c}$) which are 120° out of phase with each other, can be obtained from the centroid vectors ($e_{2a}$, $e_{2b}$, $e_{2c}$) of the line voltages.

The present invention utilizes the relationship between the centroid vectors of the line voltages and the wye-phase voltages. By using the centroid vectors ($e_{2a}$, $e_{2b}$, $e_{2c}$) easily calculated by the vector operation from the line voltages ($e_{ab}$, $e_{bc}$, $e_{ca}$) being the delta voltages, instead of directly detecting the wye-phase voltages ($e_{1a}$, $e_{1b}$, $e_{1c}$) which are 120° out of phase with each other, these centroid vectors ($e_{2a}$, $e_{2b}$, $e_{2c}$) are applied to the control of the three-phase PWM converter, thereby facilitating the compensation for the three-phase AC unbalanced voltages.

(Relationship Between the Centroid Vectors and the Phase Voltages)

Hereinafter, an explanation will be made regarding that the centroid vectors ($e_{2a}$, $e_{2b}$, $e_{2c}$) obtained by the vector operation correspond to the wye-phase voltages which are 120° out of phase with each other.

Figure 5:
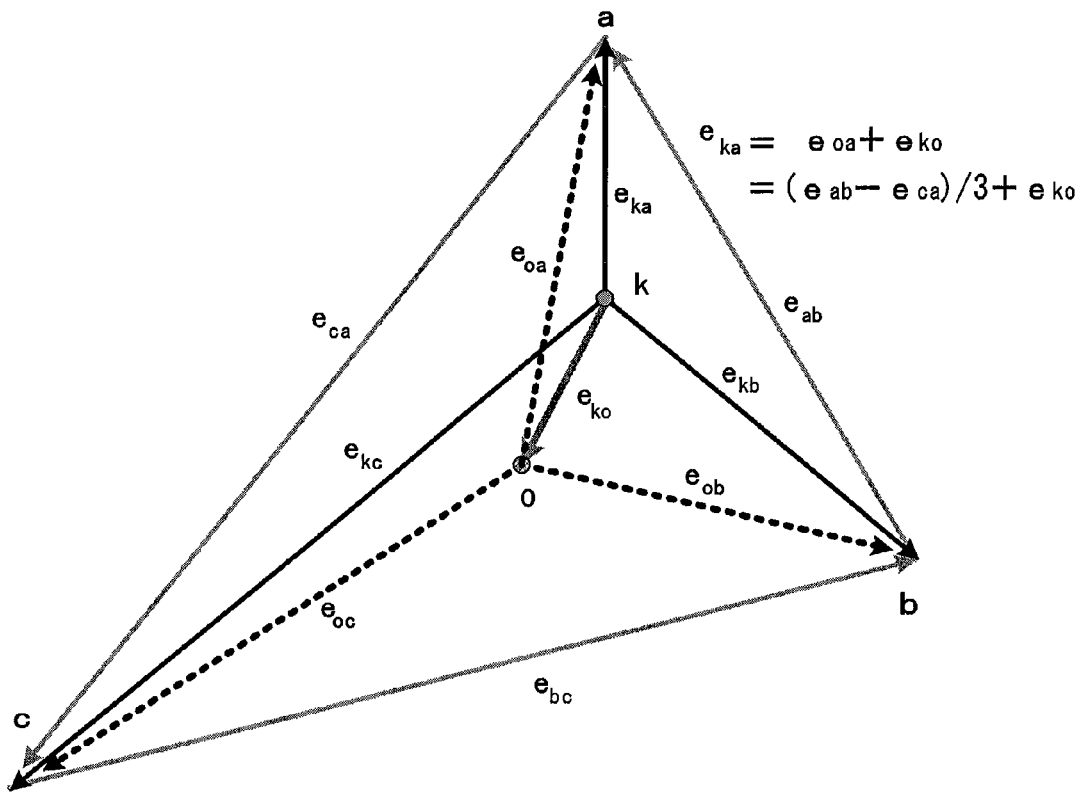
FIG. 5 illustrates a voltage vector diagram to explain the centroid vector operation in the unbalance compensation of the present invention.

FIG. 5 illustrates the relationship between the delta voltages and the wye-phase voltages. In FIG. 5, the delta voltages are represented by the line voltages ($e_{ab}$, $e_{bc}$, $e_{ca}$) between the terminals "a" and "b", "b" and "c", and "c" and "a". The wye-phase voltages ($e_{ka}$, $e_{kb}$, $e_{kc}$) are represented by the vector voltages from an arbitrary point k to each of the terminals a, b, and c. The point k is a reference point arbitrarily determined in the wye-phase voltages.

Here, if the wye-phase voltages ($e_{ka}$, $e_{kb}$, $e_{kc}$) are given, the delta voltages ($e_{ab}$, $e_{bc}$, $e_{ca}$) are determined in standardized manner. On the other hand, even when the delta voltages ($e_{ab}$, $e_{bc}$, $e_{ca}$) are given, the reference point k can be defined at any position and thus the point may exist countlessly. Therefore, the wye-phase voltages ($e_{ka}$, $e_{kb}$, $e_{kc}$) are not determined in standardized manner, and there exist infinite number of combinations that may be represented as the wye-phase voltages ($e_{ka}$, $e_{kb}$, $e_{kc}$). It is to be noted that the zero-phase-sequence voltage according to the wye-phase voltages ($e_{ka}$, $e_{kb}$, $e_{kc}$) is assumed as $e_{ko}$, and the point "o" is assumed as the reference point of the zero-phase-sequence voltage.

According to the relationship between the delta voltages (line voltages) and the wye-phase voltages as shown in FIG. 5, following formula is obtained:

$$e_{ab} - e_{ca} = e_{ka} - e_{kb} - (e_{kc} - e_{ka}) \quad (9)$$
$$= 3e_{ka} - (e_{ka} + e_{kb} + e_{kc})$$
$$= 3e_{ka} - 3e_{ko}$$

According to the relationship of formula (9), the wye-phase voltages ($e_{ka}$, $e_{kb}$, $e_{kc}$) can be expressed by the following formulas (10) to (12), by the delta voltages ($e_{ab}$, $e_{bc}$, $e_{ca}$) and the zero-phase-sequence voltage $e_{ko}$.

$$e_{ka}=(e_{ab}-e_{ca})/3+e_{ko} \quad (10)$$

$$e_{kb}=(e_{bc}-e_{ab})/3+e_{ko} \quad (11)$$

$$e_{kc}=(e_{ca}-e_{bc})/3+e_{ko} \quad (12)$$

On the other hand, as for the wye-phase voltages which are 120° out of phase with each other, when the phase angle $\phi_{1a}$ of the a-phase is represented by $\alpha$, the phase angles $\phi_{1a}$, $\phi_{1b}$, and $\phi_{1c}$ of the respective three phases a-phase, b-phase, and c-phase are expressed by;

$$\phi_{1a}=\alpha$$

$$\phi_{1b}=\alpha-2\pi/3$$

$$\phi_{1c}=\alpha+2\pi/3 \quad (13)$$

The phase angle of the positive-phase-sequence voltage is in phase with the a-phase of the wye-phase voltages having the relationship of 120° out of phase from each other. According to this relationship, a DC component as a control target of the three-phase PWM converter can be extracted by the dq-axis conversion, thereby facilitating the control of the three-phase PWM converter.

In addition, in the wye-phase voltages which are 120° out of phase with each other, the phase angle of the negative-phase-sequence voltage and that of the zero-phase-sequence voltage, with respect to the positive-phase-sequence voltage, are in the opposite direction at the same angle.

Figure 6A:
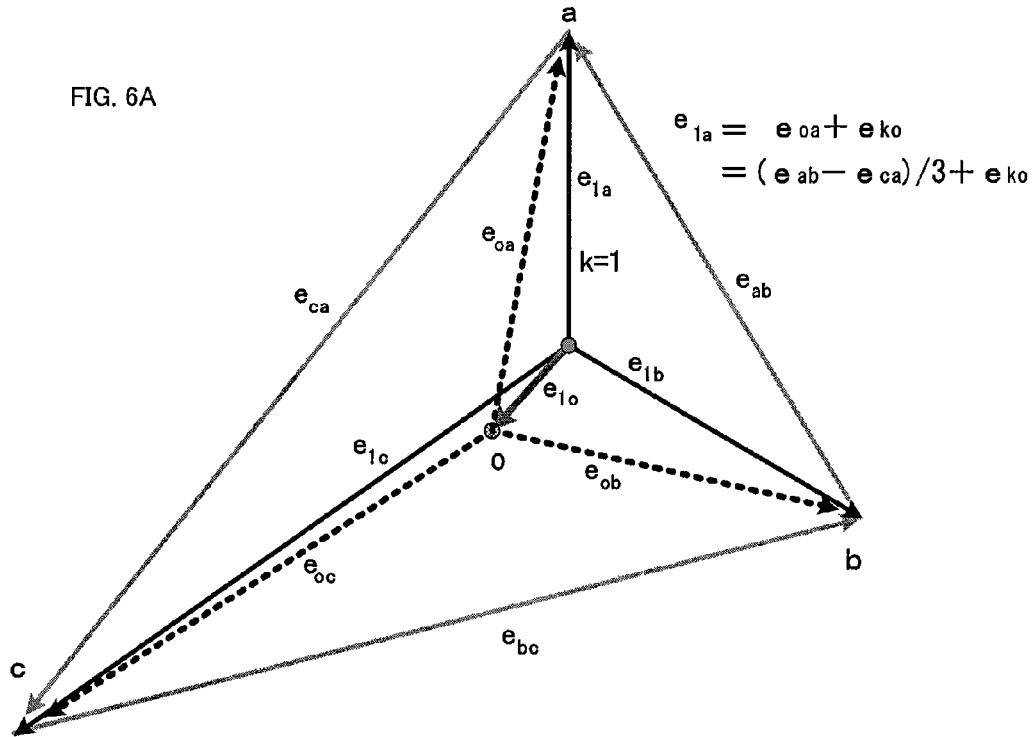
FIG. 6 illustrates voltage vector diagrams to explain the centroid vector operation in the unbalance compensation of the present invention.
Figure 6B:
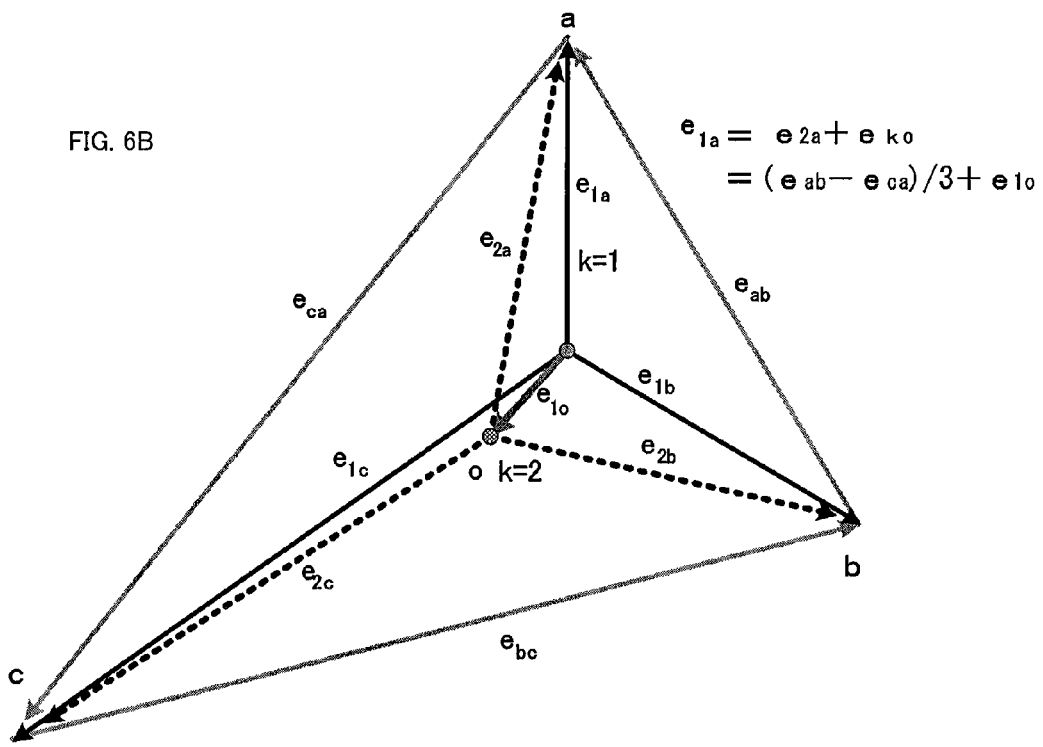

FIG. 6A illustrates the relationship between the wye-phase voltages which are 120° out of phase with each other and the reference point "o" of the zero-phase-sequence voltage. FIG. 6B illustrates the relationship between the wye-phase voltages which are 120° out of phase with each other and the reference point of the centroid vectors (centroid). In FIG. 6, the reference point of the wye-phase voltages which are 120° out of phase with each other is represented by K=1, and the reference point (centroid) of the centroid vectors is represented by K=2.

As shown in FIG. 6A, the wye-phase voltages ($e_{1a}$, $e_{1b}$, $e_{1c}$) which are 120° out of phase with each other are expressed by the following formula (14) assuming that K=1 in the formulas (10) to (12):

$$e_{1a} = (e_{ab} - e_{ca})/3 + e_{1o} = e_{oa} + e_{1o}$$

$$e_{1b} = (e_{bc} - e_{ab})/3 + e_{1o} = e_{ob} + e_{1o}$$

$$e_{1c} = (e_{ca} - e_{bc})/3 + e_{1o} = e_{oc} + e_{1o} \quad (14)$$

On the other hand, as shown in FIG. 6B, the centroid vectors ($e_{2a}$, $e_{2b}$, $e_{2c}$) are obtained by the vector operation, as to the two line voltages out of the delta voltages ($e_{ab}$, $e_{bc}$, $e_{ca}$), and when the point of the centroid vector is represented by K=2, the centroid vectors are expressed by the following formula (15)(S2):

$$e_{2a} = (e_{ab} - e_{ca})/3$$

$$e_{2b} = (e_{bc} - e_{ab})/3$$

$$e_{2c} = (e_{ca} - e_{bc})/3$$

$$e_{2o} = (e_{2a} + e_{2b} + e_{2c})/3 = 0 \quad (15)$$

According to FIG. 6B, when the wye-phase voltages ($e_{1a}$, $e_{1b}$, $e_{1c}$) which are 120° out of phase with each other are expressed by using the centroid vectors ($e_{2a}$, $e_{2b}$, $e_{2c}$), the aforementioned formula (8) can be obtained.

The formula (8) indicates that, as described above, the wye-phase voltages ($e_{1a}$, $e_{1b}$, $e_{1c}$) are represented by the vectorial sum of the respective centroid vectors of the line voltages ($e_{2a}$, $e_{2b}$, $e_{2c}$) and the zero-phase-sequence voltage $e_{1o}$.

On the other hand, as for the wye-phase voltages which are 120° out of phase with each other, when the phase angle of the a-phase is represented by α, the phase angles $\phi_{1a}$, $\phi_{1b}$, and $\phi_{1c}$ of the a-phase, b-phase, and c-phase respectively are expressed by:

$$\phi_{1a} = \alpha$$

$$\phi_{1b} = \alpha - 2\pi/3$$

$$\phi_{1c} = \alpha + 2\pi/3 \quad (16)$$

The phase angle of the positive-phase-sequence voltage is in phase with the a-phase of the wye-phase voltages which are 120° out of phase with each other.

With the relationship above, the DC component as a control target of the three-phase PWM converter can be extracted by the dq-axis conversion, thereby facilitating the control of the three-phase PWM converter (S3).

In the wye-phase voltages which are 120° out of phase with each other, the phase angle of the negative-phase-sequence voltage and that of the zero-phase-sequence voltage, with respect to the positive-phase-sequence voltage, are in the opposite direction at the same angle.

Therefore, instead of the wye-phase voltages ($e_{1a}$, $e_{1b}$, $e_{1c}$) which are 120° out of phase with each other, the centroid vectors of the line voltages ($e_{2a}$, $e_{2b}$, $e_{2c}$) are used to extract the positive-phase-sequence voltage $e_p$ and the negative-phase-sequence voltage $e_q$ from these centroid vectors ($e_{2a}$, $e_{2b}$, $e_{2c}$), thereby taking out the DC component as a control target of the three-phase PWM converter, and it is further possible to compensate for the unbalanced voltages by extracting the zero-phase-sequence voltage (S4).

Next, the centroid vectors ($e_{2a}$, $e_{2b}$, $e_{2c}$) obtained in the step S2 are subjected to the dq-axis conversion process, and the d-axis component $e_{1d}$ and the q-axis component $e_{1q}$ are obtained. This conversion is conducted so as to control the three-phase PWM converter by the DC component (S3).

In order to perform the dq-axis conversion, a spatial vector is converted into a real vector. When the phase difference between the wye-phase voltages ($e_{1a}$, $e_{1b}$, $e_{1c}$) and the three-phase balanced voltage ($e_r$, $e_s$, $e_t$) are assumed as α, the wye-phase voltages ($e_{1a}$, $e_{1b}$, $e_{1c}$) are equivalent to a real part of the wye-phase voltages represented by the spatial vector, and they are expressed by the following formula (17):

$$e_{1a} = E_{1am} \cos(\omega t + \alpha)$$

$$e_{1b} = E_{1bm} \cos(\omega t + \alpha - 2\pi/3)$$

$$e_{1c} = E_{1cm} \cos(\omega t + \alpha + 2\pi/3) \quad (17)$$

When these wye-phase voltages are subjected to the dq-axis conversion, the d-axis, the q-axis and the zero-phase-sequence component can be obtained. However, in the delta connection, it is not possible to directly detect the wye-phase voltages ($e_{1a}$, $e_{1b}$, $e_{1c}$) which are 120° out of phase with each other, and they are not given. Therefore, the zero-phase-sequence voltage $e_{1o}$ is unclear.

In the present invention, instead of the wye-phase voltages ($e_{1a}$, $e_{1b}$, $e_{1c}$) which cannot be detected directly, the centroid vectors ($e_{2a}$, $e_{2b}$, $e_{2c}$) are employed, which are obtained by subjecting detectable line voltages to the centroid vector operation. Accordingly, with the line voltages at one measurement point of time, it is possible to compensate for the three-phase unbalanced voltages.

When the wye-phase voltages ($e_{1a}$, $e_{1b}$, $e_{1c}$) of the formula (8) are subjected to the dq-axis conversion, following formula (18) is established:

$$\begin{bmatrix} e_{1d} \\ e_{1q} \\ e_{1z} \end{bmatrix} = \frac{2}{3} \begin{bmatrix} \cos\omega t & \cos(\omega t - 2\pi/3) & \cos(\omega t + 2\pi/3) \\ -\sin\omega t & -\sin(\omega t - 2\pi/3) & -\sin(\omega t + 2\pi/3) \\ 1 & 1 & 1 \end{bmatrix} \begin{bmatrix} e_{1a} \\ e_{1b} \\ e_{1c} \end{bmatrix} \quad (18)$$

When the centroid vectors ($e_{2a}$, $e_{2b}$, $e_{2c}$) of the formula (15) are subjected to the dq-axis conversion, following formula (19) is established:

$$\begin{bmatrix} e_{2d} \\ e_{2q} \\ e_{2z} \end{bmatrix} = \frac{2}{3} \begin{bmatrix} \cos\omega t & \cos(\omega t - 2\pi/3) & \cos(\omega t + 2\pi/3) \\ -\sin\omega t & -\sin(\omega t - 2\pi/3) & -\sin(\omega t + 2\pi/3) \\ 1 & 1 & 1 \end{bmatrix} \begin{bmatrix} e_{2a} \\ e_{2b} \\ e_{2c} \end{bmatrix} \quad (19)$$

$$= \begin{bmatrix} e_{1d} \\ e_{1q} \\ 0 \end{bmatrix}$$

The d-axis components $e_{1d}$, $e_{2d}$, and the q-axis components $e_{1q}$, $e_{2q}$ after the dq-axis conversion, expressed by the formulas (18) and (19), are not influenced by the zero-phase-sequence voltage $e_{1o}$ expressed by the formula (14), and the values of the d-axis components are equal to each other, and the values of the q-axis components are equal to each other.

When the formula (19) is employed, which is obtained by subjecting the formula (15) to the dq-axis conversion, the formula (15) expressing the instantaneous line voltages ($e_{ab}$, $e_{bc}$, $e_{ca}$) obtained at one measurement point, it is possible to respond to the PFC control at high speed, by acquiring the line voltages at one measurement point without using the values at multiple measurement points of time.

It is to be noted that if the PFC control is performed by using the formula (19), the zero-phase-sequence voltage $e_{1o}$ does not appear in the formula (19). Therefore, the zero-phase-sequence voltage $e_{1o}$ is calculated by using the positive-phase-sequence voltage and the negative-phase-sequence voltage. Calculation of the zero-phase-sequence voltage $e_{1o}$ will be described in the following (S3).

Next, symmetrical component voltages (positive-phase-sequence voltage, negative-phase-sequence voltage, and zero-phase-sequence voltage) are obtained from the d-axis component $e_{1d}$ and the q-axis component $e_{1q}$, which are acquired by the dq-axis conversion (S4).

(Calculation of the Symmetrical Component Voltages)

Hereinafter, with reference to the flowchart shown in FIG. 4, the calculation of the symmetrical component voltages will be explained.

As to the wye-phase voltages ($e_{1a}$, $e_{1b}$, $e_{1c}$) which are 120° out of phase with each other, when the positive-phase-component voltage is assumed as $e_{1p}$, the negative-phase-sequence voltage is assumed as $e_{1n}$, and the zero-phase-sequence voltage is assumed as $e_{1o}$, the wye-phase voltages ($e_{1a}$, $e_{1b}$, $e_{1c}$) are expressed by the following:

$$e_{1a}=e_{1p}+e_{1n}+e_{1o}$$

$$e_{1b}=e_{1p} \cdot e^{-j2\pi/3}+e_{1n} \cdot e^{j2\pi/3}+e_{1o}$$

$$e_{1c}=e_{1p} \cdot e^{j2\pi/3}+e_{1n} \cdot e^{-j2\pi/3}+e_{1o}$$

$$e_{1a}=E_{1pm}\cos(\omega t+\alpha)+E_{1nm}\cos(\omega t+\phi_{1n})+E_{1om}\cos(\omega t+\phi_{1o})$$

$$e_{1b}=E_{1pm}\cos(\omega t+\alpha-2\pi/3)+E_{1nm}\cos(\phi t+\phi_{1n}+2\pi/3)+E_{1om}\cos(\omega t+\phi_{1o})$$

$$e_{1c}=E_{1pm}\cos(\omega t+\alpha+2\pi/3)+E_{1nm}\cos(\omega t+\phi_{1n}-2\pi/3)+E_{1om}\cos(\omega t+\phi_{1o}) \qquad (20)$$

By subjecting those elements to the dq-axis conversion, the following formula (21) is obtained.

$$\begin{bmatrix} e_{1d} \\ e_{1q} \end{bmatrix} = \begin{bmatrix} e_{1dp} \\ e_{1qp} \end{bmatrix} + \begin{bmatrix} e_{1dn} \\ e_{1qn} \end{bmatrix} \qquad (21)$$

$$= E_{1pm}\begin{bmatrix} \cos\alpha \\ \sin\alpha \end{bmatrix} + E_{1nm}\begin{bmatrix} \cos(2\omega t+\phi_{1n}) \\ \sin(2\omega t+\phi_{1n}) \end{bmatrix}$$

The positive-phase-sequence voltage ($e_{1dp}$, $e_{1qp}$) in the formula (21) corresponds to the DC component, and the negative-phase-sequence voltage ($e_{1dn}$, $e_{1qn}$) corresponds to the AC component. Therefore, it is possible to extract the positive-phase-sequence voltage ($e_{1dp}$, $e_{1qp}$) and the negative-phase-sequence voltage ($e_{1dn}$, $e_{1qn}$), according to the frequency separation.

This frequency separation can be performed by using a band pass filter or a low pass filter. By way of example, the positive-phase-sequence voltage ($e_{1dp}$, $e_{1qp}$) can be extracted by the low pass filter, and ($E_{1pm}\cos\alpha$, $E_{1pm}\sin\alpha$) are acquired. In addition, the negative-phase-sequence voltage ($e_{1dn}$, $e_{1qn}$) can be extracted by subtracting the positive-phase-sequence voltages ($e_{1dp}$, $e_{1qp}$) being extracted, from the original signals having been subjected to the dq-axis conversion, and ($E_{1nm}\cos(2\omega t+\phi_{1n})$, $-E_{1nm}\sin(2\omega t+\phi_{1n})$) are acquired (S41, S42).

When the clock time of the measuring point is assumed as "ts", the phase angle $\alpha$ of the positive-phase-sequence voltage and the phase angle $\phi_{1n}$ of the negative-phase-sequence voltage can be obtained, respectively by the formula (22) and the formula (23):

$$\alpha=\tan^{-1}(e_{1qp}/e_{1dp}) \qquad (22)$$

$$\phi_{1n}=-2\omega t_s-\tan^{-1}(e_{1qn}/e_{1dn}) \qquad (23)$$

The negative-phase-sequence voltage $e_{1n}$ is expressed by the formula (25) and the formula (26), according to the formula (24):

$$3e_{1n} = E_{1am}\cos(\omega t+\alpha) + E_{1bm}\cos(\omega t+\alpha+2\Pi/3)+E_{1cm}\cos(\omega t+\alpha-2\Pi/3) \qquad (24)$$

$$e_{1n} = \frac{1}{3}\sqrt{\left\{E_{1am}-\frac{1}{2}(E_{1bm}+E_{1cm})\right\}^2 + \left\{\frac{\sqrt{3}}{2}(E_{1bm}-E_{1cm})\right\}^2} \qquad (25)$$

$$\cos(\omega t+\alpha+\phi')$$

$$\phi' = \tan^{-1}\left(\frac{\frac{\sqrt{3}}{2}(E_{1bm}-E_{1cm})}{E_{1am}-\frac{1}{2}(E_{1bm}+E_{1cm})}\right) \qquad (26)$$

In addition, the zero-phase-sequence voltage $e_{1o}$ is expressed by the formula (27):

$$e_{1o} = \frac{1}{3}\sqrt{\left\{E_{1am}-\frac{1}{2}(E_{1bm}+E_{1cm})\right\}^2 + \left\{\frac{\sqrt{3}}{2}(E_{1bm}-E_{1cm})\right\}^2} \qquad (27)$$

$$\cos(\omega t+\alpha-\phi')$$

In the formula above, according to the relationship that:

$$E_{1om}=E_{1nm}$$

$$\phi_{1n}=\alpha+\phi'$$

$$\phi_{1o}=\alpha-\phi',$$

the following relationship is found:

$$\phi_{1o}=2\alpha-\phi_{1n} \qquad (28)$$

Therefore, the phase $\phi_{1o}$ of the zero-phase-sequence voltage $e_{1o}$ is expressed by the following formula (29):

$$\phi_{1o}=2\omega t_s+2\tan^{-1}(e_{1qp}/e_{1dp})+\tan^{-1}(e_{1qn}/e_{1dn}) \qquad (29)$$

(S43)

The amplitude $E_{1om}$ of the zero-phase-sequence voltage $e_{1o}$ is expressed by the following, according to the negative-phase-sequence voltage ($e_{1dn}$, $e_{1qn}$):

$$E_{1om}=(e_{1dn}^2+e_{1qn}^2)^{1/2} \qquad (30)\ (S44)$$

Therefore, the zero-phase-sequence voltage $e_{1o}$ is expressed by the following:

$$e_{1o}=(e_{1dn}^2+e_{1qn}^2)^{1/2}\cdot\cos(\omega t+\phi_{1o}) \qquad (31)\ (S45)$$

Accordingly, the wye-phase voltages ($e_{1a}$, $e_{1b}$, $e_{1c}$) which are 120° out of phase with each other are expressed by the following formulas (32) to (34):

$$e_{1a}=(e_{ab}-e_{ca})/3+(e_{1dn}^2+e_{1qn}^2)^{1/2}\cdot\cos(\omega t+\phi_{1o}) \qquad (32)$$

$$e_{1b}=(e_{bc}-e_{ab})/3+(e_{1dn}^2+e_{1qn}^2)^{1/2}\cdot\cos(\omega t+\phi_{1o}) \qquad (33)$$

$$e_{1c}=(e_{ca}-e_{bc})/3+(e_{1dn}^2+e_{1qn}^2)^{1/2}\cdot\cos(\omega t+\phi_{1o}) \qquad (34)$$

Next, the zero-phase-sequence voltage compensates for the unbalanced voltages and simultaneously the PFC control is performed (S5). Then, the wye-phase voltages ($e_{1a}$, $e_{1b}$, $e_{1c}$) are obtained, which are 120° out of phase with each other and on which the unbalanced voltage compensation and the power factor control have been performed (S6), and a control signal is generated for controlling the three-phase PWM converter based on the obtained wye-phase voltages ($e_{1a}$, $e_{1b}$, $e_{1c}$) (S7).

[Configuration Example of Unbalanced Voltage Compensator]

Next, with reference to FIG. 7, a more detailed configuration example will be explained regarding the unbalanced voltage compensator of the present invention.

Figure 7:
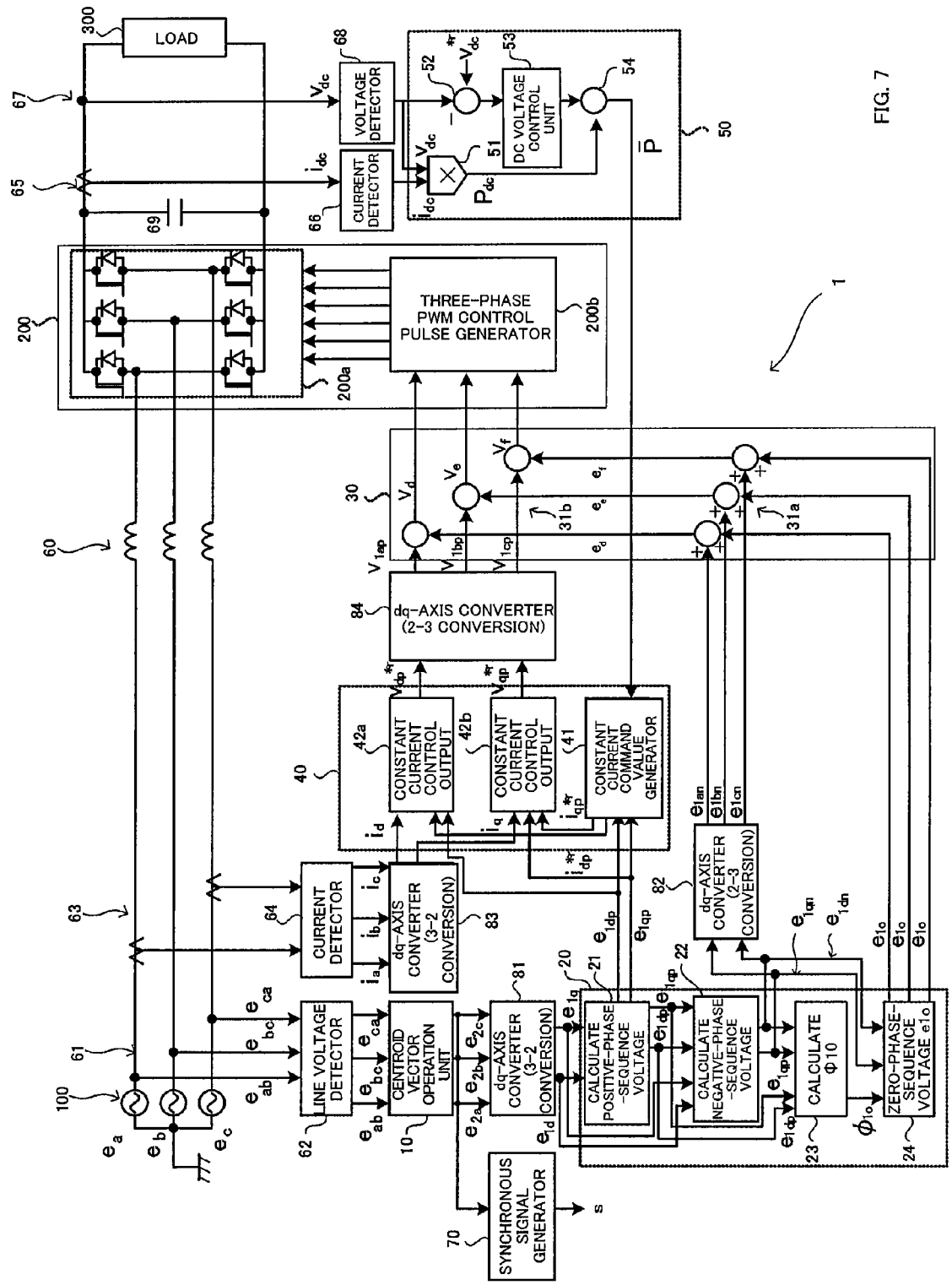
FIG. 7 illustrates a more detailed configuration example of the unbalanced voltage compensator according to the present invention.

In the configuration example of the unbalanced voltage compensator as shown in FIG. 7, similar to the schematic configuration as shown in FIG. 2, the three-phase AC power source 100 supplies the three-phase AC power to the three-phase converter 200, and the converter subjects three-phase AC voltages of the three-phase AC power to the PWM conversion to obtain DC voltage, and outputs the DC voltage to the DC load 300.

The unbalanced voltage compensator 1 of the present invention is provided with the centroid vector operation unit 10 for obtaining wye-phase voltages ($e_{2a}$, $e_{2b}$, $e_{2c}$) from each of the line voltages ($e_{ab}$, $e_{bc}$, $e_{ca}$) of the distribution line three-phase balanced voltages $e_a$, $e_b$, and $e_c$, the symmetric coordinate component calculation unit 20 for calculating three-phase balanced system symmetrical component voltages ($e_{1dp}$, $e_{1qp}$, $e_{1dn}$, $e_{1qn}$) from the wye-phase voltages ($e_{2a}$, $e_{2b}$, $e_{2c}$) which are obtained in the centroid vector operation 10, and the adder 30 for forming a compensation signal for compensating for the unbalanced voltage of the three-phase AC voltages and subjecting the three-phase AC voltages to the PWM conversion to generate a control signal for outputting DC voltage, and those three elements constitute the unbalanced voltage compensation unit.

The unbalanced voltage compensator 1 of the present invention is provided with the constant current control unit 40 and the average power operation unit 50 for performing the PFC control. In addition, on the distribution line, the input side of the three-phase PWM converter 200 is provided with contact points 61 for detecting the line voltages, sensors 63 for measuring a current value, and AC reactors 60. Furthermore, the output side of the three-phase PWM converter 200 is provided with a contact point 67 for detecting DC voltage, a sensor 65 for measuring DC current to detect the DC voltage, and a capacitor 69 for output smoothness.

On the input side of the three-phase PWM converter, the contact points 61 are connected to a line voltage detector 62, and the line voltage detector 62 measures the line voltages of the three-phase voltages. The sensors 63 are connected to a current detector 64, and the current detector 64 measures the current of the three-phase voltages.

In addition, on the output side of the three-phase PWM converter 200, a voltage detector 68 is connected to the contact point 67, and the voltage detector 68 measures the output voltage. In addition, the sensor 65 is connected to a current detector 66, and the current detector 66 measures the output current.

The three-phase AC power source outputs the three-phase input power, the voltage $V_a$ phase, voltage $V_b$ phase, and voltage $V_c$ phase. The voltages $V_a$, $V_b$, and $V_c$ are respectively the phase voltages of the a-phase, b-phase, and c-phase. The contact points 61 have the points to establish contact respectively with the a-phase line, b-phase line, and c-phase line. The sensors 63 are installed respectively on the a-phase line and on the c-phase line, and those sensors detect AC input current inputted from the three-phase AC power source. The AC reactors 60 are respectively provided on the a-phase line, b-phase line, and c-phase line, so as to block high-frequency current.

The dq-axis converters 81, 82, 83, and 84 are provided for converting from three axes to two axes, or from two axes to three axes. The dq-axis converter 81 converts the wye-phase voltages ($e_{2a}$, $e_{2b}$, $e_{2c}$) obtained in the centroid vector operation unit 10 into the d-axis voltage $e_{1d}$ and the q-axis voltage $e_{1q}$, the dq-axis converter 82 converts the biaxial negative-phase-sequence voltages ($e_{1dn}$, $e_{1qn}$) into the triaxial negative-phase-sequence voltages ($e_{1an}$, $e_{1bn}$, $e_{1cn}$), the dq-axis converter 83 converts $i_a$, $i_b$, and $i_c$ obtained from the current detector 64 into the d-axis current $i_d$ and the q-axis current $i_q$, and the dq-axis converter 84 converts the biaxial positive-phase-sequence voltages ($v_{dp}^{*r}$, $v_{qp}^{*r}$) after the constant current control is performed, into the triaxial positive-phase-sequence voltages ($e_{1ap}$, $e_{1bp}$, $e_{1cp}$).

In addition, a synchronous signal generator 70 is connected to the centroid vector operation unit 10, and based on the wye-phase voltages ($e_{2a}$, $e_{2b}$, $e_{2c}$) obtained in the centroid vector operation unit 10, a synchronous signal "s" is generated to synchronize the dq-axis converters 81, 82, and 83.

The three-phase converter 200 is provided with a three-phase PWM circuit 200a, and a three-phase PWM pulse generator 200b for generating pulse signals to control the operation of the three-phase PWM circuit 200a so as to perform the PWM control. The three-phase PWM pulse generator 200b forms the pulse signals based on the phase voltages ($V_d$, $V_e$, $V_f$) generated by the adder 30. The three-phase PWM circuit 200a may be formed of a bridge circuit, being made up of a switching element for instance, and the pulse signals control ON/OFF operation of the switching element, thereby performing the PWM control.

For example, the three-phase PWM circuit 200a of the three-phase converter 200 may be made up of a semiconductor switching element such as an IGBT (Insulated Gate Bipolar Transistor) and a diode, and each gate of the semiconductor switching element is controlled ON and OFF, thereby converting the three-phase AC power being inputted into DC power and outputting the DC power.

The capacitor 69, the sensor 65, and the contact point 67 are provided on the output side of the three-phase converter 200. The capacitor 69 smoothes the DC voltage outputted from the three-phase converter 200. The sensor 65 is a current sensor for detecting the DC output current that is outputted from the three-phase converter 200, and a current detector 66 detects a current value $I_{dc}$ of the DC output current. The contact point 67 is a point to establish contact with the DC output line of the three-phase converter 200, and the voltage detector 68 detects a voltage value $V_{dc}$ of the DC output voltage.

Hereinafter, each unit of the unbalanced voltage compensator 1 will be explained.

The line voltage detector 62 detects line voltages ($e_{ab}$, $e_{bc}$, $e_{ca}$) of the three-phase AC input voltages at the contact points 61. The centroid vector operation unit 10 calculates and obtains the centroid vector voltages ($e_{2a}$, $e_{2b}$, $e_{2c}$) from the line voltages ($e_{ab}$, $e_{bc}$, $e_{ca}$) detected in the line voltage detector 62, and the obtained centroid vector voltages ($e_{2a}$, $e_{2b}$, $e_{2c}$) are used as substituting signals for the phase voltages ($e_{1a}$, $e_{1b}$, $e_{1c}$) which are 120° out of phase with each other.

The dq converter (conversion from three-phase to two-phase) 81 converts the centroid vector voltages ($e_{2a}$, $e_{2b}$, $e_{2c}$) obtained in the centroid vector operation unit 10, into voltages signals ($e_{1d}$, $e_{1q}$) of the d-axis and q-axis (two phases). The synchronous signal generator 70 uses the centroid vector voltages ($e_{2a}$, $e_{2b}$, $e_{2c}$) obtained in the centroid vector operation unit 10 to generate the synchronous signal "s". The dq-axis conversion by the dq converter 81 can be conducted based on the formula (21) as described above.

The current detector 64 acquires detection signals of the a-phase and c-phase AC input current, which are detected by the sensors 63, and generates signals ($i_a$, $i_b$, $i_c$) of the three-phase AC input current. The current detector 64 generates the three-phase AC input current signals by using that the total sum of the AC input current of the a-phase, b-phase, and c-phase becomes zero. Therefore, if it is configured such that at least two AC input currents out of the a-phase, b-phase, and c-phase are detected, input currents of the three phases can be acquired.

The dq converter (conversion from three-phase to two-phase) 83 converts the three-phase AC input current signals ($i_a$, $i_b$, $i_c$) detected in the current detector 64 into a d-axis current signal and a q-axis current signal ($i_d$, $i_q$) (two phases).

The symmetric coordinate component calculator 20 is provided with a positive-phase-sequence voltage calculator 21, a negative-phase-sequence voltage calculator 22, a $\phi_{1o}$ calculator 23, and a zero-phase-sequence voltage calculator 24, inputs the voltage signals ($e_{1d}$, $e_{1q}$) of the d-axis and q-axis (two phases) converted by the dq converter 81 (conversion from three-phase to two-phase), and calculates the positive-phase-sequence voltage ($e_{1dp}$, $e_{1qp}$), the negative-phase-sequence voltage ($e_{1dn}$, $e_{1qn}$), and the zero-phase-sequence component voltage ($e_{1o}$), which are symmetrical component voltages.

In the aforementioned formula (21), in the d-axis voltage $e_{1d}$ and in the q-axis voltage $e_{1q}$ obtained by subjecting the centroid vector voltage ($e_{2a}$, $e_{2b}$, $e_{2c}$) to the dq-axis conversion, the DC components ($E_{1pm} \cos \alpha$, $E_{1pm} \sin \alpha$) are equivalent to the positive-phase-sequence voltages ($e_{1dp}$, $e_{1qp}$), the AC components ($E_{1nm} \cos(2\omega t+\phi_{1n})$, $-E_{1nm} \sin(2\omega t+\phi_{1n})$) are equivalent to the negative-phase-sequence voltages ($e_{1dn}$, $e_{1qn}$). Therefore, it is possible to extract the positive-phase-sequence voltages ($e_{1dp}$, $e_{1qp}$) and the negative-phase-sequence voltages ($e_{1dn}$, $e_{1qn}$) according to the frequency separation.

The positive-phase-sequence voltage calculator 21 is capable of extracting the positive-phase-sequence voltages ($e_{1dp}$, $e_{1qp}$) by using a band pass filter or a low pass filter. In addition, the negative-phase-sequence voltage calculator 22 subtracts from the original signals after the dq-axis conversion, the positive-phase-sequence voltages ($e_{1dp}$, $e_{1qp}$) extracted in the positive-phase-sequence voltage calculator 21, thereby extracting the negative-phase-sequence voltages ($E_{1nm} \cos(2\omega t+\phi_{1n})$, $-E_{1nm} \sin(2\omega t+\phi_{1n})$).

As described above, the zero-phase-sequence voltage $e_{1o}$ can be expressed by the formula (31), and the phase $\phi_{1o}$ of the zero-phase-sequence voltage $e_{1o}$ is expressed by the formula (29). The amplitude $E_{1om}$ of the zero-phase-sequence voltage $e_{1o}$ is expressed by the formula (30).

Then, the $\phi_{1o}$ calculator 23 uses the positive-phase-sequence voltage ($e_{1dp}$, $e_{1qp}$) and the negative-phase-sequence voltage ($e_{1dn}$, $e_{1qn}$) to calculate the phase $\phi_{1o}$, and inputs the calculated phase into the zero-phase-sequence voltage calculator 24. Then, the zero-phase-sequence voltage calculator 24 uses the phase calculated by the $\phi_{1o}$ calculator 23 and the negative-phase-sequence voltage ($e_{1dn}$, $e_{1qn}$) calculated by the negative-phase-sequence voltage calculator 22, thereby obtaining the zero-phase-sequence voltage $e_{1o}$.

The positive-phase-sequence voltages ($e_{1dp}$, $e_{1qp}$) calculated by the positive-phase-sequence voltage calculator 21 are subjected to the constant current control in the constant current control unit 40, and the two-to-three axis conversion in the dp converter 84 converts the voltages into the positive-phase-sequence voltages ($V_{1ap}$, $V_{1bp}$, $V_{1cp}$) respectively associated with the positive-phase-sequence voltages ($e_{1ap}$, $e_{1bp}$, $e_{1cp}$), and thereafter those voltages are inputted in the adder 30.

The negative-phase-sequence voltages ($e_{1dn}$, $e_{1qn}$) calculated in the negative-phase-sequence voltage calculator 22 are converted from two-axis to three-axis, and after converted into the negative-phase-sequence voltages ($e_{1an}$, $e_{1bn}$, $e_{1cn}$), thereafter inputted into the adder 30. The zero-phase-sequence voltage $e_{1o}$, calculated in the zero-phase-sequence voltage calculator 24 is inputted to the adder 30.

The adder 30 adds the inputted positive-phase-sequence voltages ($V_{1ap}$, $V_{1bp}$, $V_{1cp}$), the negative-phase-sequence voltages ($e_{1an}$, $e_{1bn}$, $e_{1cn}$), and the zero-phase-sequence voltage $e_{1o}$, and then outputs the phase voltages ($e_d$, $e_e$, $e_f$). These phase voltages ($e_d$, $e_e$, $e_f$) are signals after the unbalance compensation and the constant current control are performed. The three-phase PWM control pulse generator 200b of the three-phase PWM converter 200 generates control pulse signals to control the three-phase PWM circuit 200a based on the phase voltages ($e_d$, $e_e$, $e_f$).

Hereinafter, an explanation will be made as to the configuration for the constant current control. In order to perform the constant current control of the three-phase PWM converter, it is necessary to know a relational expression between the input power and the input voltage.

As shown in the following, space vector $I_a$ represents the a-phase current $i_a$ according to the positive-phase-sequence current amplitude $I_{pm}$ and the negative-phase-sequence current amplitude $I_{nm}$, and the formula below is established:

$$I_a = I_{pm} e^{j(\omega t+\beta)} + I_{nm} e^{-j(\omega t+\beta)} \tag{35}$$

On the other hand, the a-phase-sequence voltage $e_{1a}$ expressed by the formula (20) is converted into the space vector $V_{1a}$, and when the input power $P_{in}$ is obtained, the following formula is established:

$$\begin{aligned} P_{in} &= P + jQ \\ &= \frac{3}{2} V_{1a} I_a^* \\ &= \frac{3}{2} \{E_{1pm} e^{j(\omega t+\alpha)} + E_{1nm} e^{-j(\omega t+\phi_{1n})}\} \\ &\quad \{I_{pm} e^{-j(\omega t+\beta)} + I_{nm} e^{j(\omega t+\lambda_n)}\} \\ &= \frac{3}{2} \{E_{1pm} I_{pm} e^{j(\alpha-\beta)} + E_{1nm} I_{nm} e^{-j(\phi_{1n}-\lambda_n)} + \\ &\quad E_{1pm} I_{nm} e^{j(2\omega t+\alpha+\lambda_n)} + E_{1nm} I_{pm} e^{-j(2\omega t+\phi_{1n}+\beta)}\} \end{aligned} \tag{36}$$

After the zero-current control is performed, the negative-phase-sequence current $I_{nm}$ becomes zero ($I_{nm}=0$).

Under the condition that "$I_{nm}=0$", "P" and "Q" in the input power $P_{in}$ expressed by the formula (36) are further expressed as the following:

$$P = \tag{37}$$
$$\frac{3}{2} \{v_{dp}^e i_{dp}^e + v_{qp}^e i_{qp}^e + \cos 2\omega t (v_{dn}^e i_{dp}^e + v_{qn}^e i_{qp}^e) + \sin 2\omega t (v_{qn}^e i_{dp}^e - v_{dn}^e i_{qp}^e)\}$$

$$Q = \tag{38}$$
$$\frac{3}{2} \{v_{qp}^e i_{dp}^e - v_{dp}^e i_{qp}^e + \cos 2\omega t (v_{qn}^e i_{dp}^e - v_{dn}^e i_{qp}^e) - \sin 2\omega t (v_{dn}^e i_{dp}^e + v_{qn}^e i_{qp}^e)\}$$

Here, the following is to be noted:

$$\left.\begin{array}{ll} v_{dp}^e = E_{1pm}\cos\alpha, & v_{qp}^e = E_{1pm}\sin\alpha \\ v_{dn}^e = E_{1nm}\cos\phi_{1n}, & v_{qn}^e = -E_{1nm}\sin\phi_{1n} \\ i_{dp}^e = I_{pm}\cos\beta, & i_{qp}^e = I_{pm}\sin\beta \end{array}\right\} \quad (39)$$

As for $P_{in}$ in the formula (36), when the average value power control and the zero control of the negative-phase-sequence current are performed, the term "$2\omega t$" in the formulas (37) and (38) can be eliminated. If the average value power of P and Q is assumed as "$P_{ave}$" and "$Q_{ave}$", the following formula is obtained:

$$\begin{bmatrix} P_{ave} \\ Q_{ave} \end{bmatrix} = \frac{3}{2}\begin{bmatrix} v_{dp}^e & v_{qp}^e \\ v_{qp}^e & -v_{dp}^e \end{bmatrix}\begin{bmatrix} i_{dp}^e \\ i_{qp}^e \end{bmatrix} \quad (40)$$

On the other hand, the average value power $P_{ave}$ of $P_{in}$ according to the PI control is given as the following formula, when a voltage command value is assumed as $V_{dc}^{*r}$.

$$P_{ave} = \left(k_{pv} + \frac{k_{iv}}{s}\right)(v_{dc}^{*r} - v_{dc}) + v_{dc}i_{dc} \quad (41)$$

As for the current command values in the case where $Q_{ave}$ in the formula (40) is subjected to the zero control, $i_{dc}^{*r}$ and $i_{qc}^{*r}$ substitute for the current terms respectively in the formula (40), and the following formula is established:

$$\begin{bmatrix} i_{dp}^{*r} \\ i_{qp}^{*r} \end{bmatrix} = \frac{2}{3(v_{dp}^{e2} + v_{qp}^{e2})}\begin{bmatrix} v_{dp}^e & v_{qp}^e \\ v_{qp}^e & -v_{dp}^e \end{bmatrix}\begin{bmatrix} P_{ave} \\ 0 \end{bmatrix} \quad (42)$$

This formula (42) expresses current command values according to the input power and the input voltage. The output signals $v_{dp}^{*r}$ and $v_{qp}^{*r}$ according to the constant current control using the current command values, are given as shown in the following:

$$v_{dp}^{*r} = -\left(k_p + \frac{k_i}{s}\right)(i_{dp}^{*r} - i_d) + \omega L i_q + e_{dp} \quad (43)$$

$$v_{qp}^{*r} = -\left(k_p + \frac{k_i}{s}\right)(i_{qp}^{*r} - i_q) - \omega L i_d + e_{qp} \quad (44)$$

The constant current control unit 40 determines the current command values based on the average power obtained in the average power operation unit 50, compares the current command values with the input side current detected by the current detector 64, thereby performing the constant current control over the positive-phase-sequence voltage acquired from the positive-phase-sequence voltage calculator 21, and after converting the control values ($V_{dp}^{*r}$, $V_{qp}^{*r}$) being acquired, into triaxial positive-phase-sequence signals ($V_{1ap}$, $V_{1bp}$, $V_{1cp}$) by the dq converter 84, the signals are inputted into the adder 30.

The current detector 66 acquires a detection signal of the DC output current that is detected by the sensor 65, and generates a DC output current signal $i_{dc}$. The voltage detector 68 detects a DC output voltage at the contact point 67, and generates a DC output voltage signal $v_{dc}$.

The average power operation unit 50 is provided with a multiplier 51, a subtractor 52, a DC voltage control unit 53, and an adder 54.

The subtractor 52 subtracts the DC output voltage signal $v_{dc}$ detected by the voltage detector 68, from the DC voltage command value signal $v_{dc}^{*r}$ which indicates a certain constant voltage value set as the voltage command value, and outputs a deviation signal being obtained. The multiplier 51 multiplies the DC output current signal $i_{dc}$ detected by the current detector 66, by the DC output voltage signal $v_{dc}$ detected by the voltage detector 68, and calculates an instantaneous power signal $P_{dc}$.

The DC voltage control unit 53 generates a DC voltage control signal as a result of PI (Proportional Integral) control for controlling the DC output voltage signal $v_{dc}$ to be a constant voltage value, from the deviation signal calculated by the subtractor 52. The adder 54 adds the instantaneous power signal $P_{dc}$ calculated by the multiplier 51 to the DC voltage control signal generated by the DC voltage control unit 53, thereby generating the average power signal P.

The constant current control unit 40 is provided with a constant current command value generator 41 for generating current command values, and constant current control output units 42a and 42b for generating output signals which have been subjected to the constant current control based on the current command values. The constant current control output unit 42a generates a d-axis output signal $v_{dp}^{*r}$, and the constant current control output unit 42b generates a q-axis output signal $v_{qp}^{*r}$.

The constant current command value generator 41 generates signals of the current command values ($i_{dp}^{*r}$, $i_{qp}^{*r}$) according to a computation, based on the average power signal $P_{ave}$ calculated in the adder 54, and positive-phase-sequence components of the d-axis and q-axis voltage signals ($e_{1dp}$, $e_{1qp}$) which are separated by the positive-phase-sequence voltage calculator 21.

The constant current control output unit 42a performs the constant current control based on $i_d$ from the dq converter 83 and the current command value signal $i_{dp}^{*r}$, and generates the d-axis output signal $v_{dp}^{*r}$. The constant current control output unit 42b performs the constant current control based on the $i_q$ from the dq converter 83 and the current command value signal and generates the q-axis output signal $v_{qp}^{*r}$. The constant current control is performed according to the PI control which controls the input current to be a constant current value.

The three-phase PWM control pulse generator 200b assumes the signals ($V_d$, $V_e$, $V_f$) calculated by the adding part 31b of the adder 30 as gate control signals, compares those signals with triangle wave signals generated by a carrier frequency generator (not illustrated), generates gate pulse signals as the PWM signals, and outputs the signals to each of the gates of the semiconductor switching elements in the three-phase PWM circuit 200a.

[Operation Example of the Unbalanced Voltage Compensator]

Next, an operation example of the unbalanced voltage compensator 1 will be explained. The centroid vector operation unit 10 calculates the centroid vector voltages ($e_{2a}$, $e_{2b}$, $e_{2c}$) from the line voltages ($e_{ab}$, $e_{bc}$, $e_{ca}$), and the dq-axis converter 81 converts the centroid vector voltages ($e_{2a}$, $e_{2b}$, $e_{2c}$) being calculated into the d-axis voltage signal $e_{1d}$ and the q-axis voltage signal $e_{1q}$ as expressed in the formula (21).

The first term on the right-hand side of the formula (21) expresses the positive-phase-sequence components $e_{1dp}$, $e_{1qp}$ of the d-axis and q-axis voltage signals $e_{1d}$, $e_{1q}$, and the second term on the right-hand side expresses the negative-phase-sequence components $e_{1dn}$, $e_{1qn}$ of the d-axis and q-axis voltage signals $e_{1d}$, $e_{1q}$. Therefore, it is possible to separate the d-axis and q-axis voltage signals $e_{1d}$ and $e_{1q}$ according to the frequency separation by using a filter or the like, between the positive-phase and the negative-phase; i.e., between the positive-phase-sequence components $e_{1dp}$, $e_{1qp}$ and the negative-phase-sequence components $e_{1dn}$, $e_{1qn}$. The positive-phase-sequence voltage calculator 21 and the negative-phase-sequence voltage calculator 22 perform the separation between the positive phase and the negative phase. The dq-axis converter 82 converts the negative-phase-sequence components $e_{1dn}$, $e_{1qn}$ of the d-axis and q-axis voltage signals $e_{1d}$, $e_{1q}$ having been separated between the positive-phase and the negative-phase, into phase voltage signals ($e_{1an}$, $e_{1bn}$, $e_{1cn}$) of the three-phase negative-phase-sequence components.

On the other hand, the zero-phase-sequence voltage calculator 24 calculates the zero-phase-sequence voltage $e_{1o}$, by using signal values of the positive-phase-sequence voltage and the negative-phase-sequence voltage being calculated.

As to the input power, the active power signal $P_{ave}$ and the reactive power signal $Q_{ave}$ are expressed by the formula (40), using the positive-phase-sequence components $v^e_{dp}$, $v^e_{qp}$ of the d-axis and q-axis voltage signals $v_d$, $v_q$, and input command current signals $i^e_{dp}$, $i^e_{qp}$.

The current detector 66 detects the DC output current signal $i_{dc}$ via the sensor 65. The voltage detector 68 detects the DC output voltage signal $v_{dc}$ via the contact point 67. The multiplier 51 multiplies the DC output current signal $i_{dc}$ by the DC output voltage signal $v_{dc}$, and outputs the DC output power signal $P_{dc}$. The subtractor 52 subtracts the DC output voltage signal $v_{dc}$ from the DC voltage command value signal $v_{dc}*^r$, and generates a deviation signal. The DC voltage control unit 53 performs the PI control over the deviation signal between the DC voltage command value signal $v_{dc}*^r$ and the DC output voltage signal $v_{dc}$, for controlling the DC output voltage signal $V_{dc}$ to be a constant voltage value, and then, generates a DC voltage control signal.

The adder 54 adds the DC voltage control signal outputted from the DC voltage control unit 53 to the DC output power signal $P_{dc}$, thereby outputting the average power signal $P_{ave}$. As expressed by the formula (41) the average power signal $P_{ave}$ is obtained by adding the DC voltage control signal obtained by the PI control over the deviation signal between the DC voltage command value signal $V_{dc}*^r$ and the DC output voltage signal $v_{dc}$ to the DC output power signal $P_{dc}$ ($=V_{dc} \cdot i_{dc}$).

The reactive power Q in the formula (40) is controlled so that the input power factor becomes 1, therefore, it becomes zero. Accordingly, the formula (40) is modified to the formula (42) expressing the input command current signals $i_{dp}*^r$ and $I_{qp}*^r$.

The constant current command value generator 41 generates and outputs the input command current signals $i_{dp}*^r$ and $i_{qp}*^r$ based on the average power signal $P_{ave}$ and the positive-phase-sequence components $e_{1dp}$, $e_{1qp}$ of the d-axis and q-axis voltage signals, which are calculated in the positive-phase-sequence voltage calculator 21.

On the input current side of the constant current control, the current detector 64 detects three-phase AC input current signals $i_a$, $i_b$, $i_c$ of the three-phase AC power being outputted from the three-phase AC power source 100 via the sensors 63.

The dq-axis converter 83 (conversion from three-phase to two-phase) converts the three-phase AC input current signals $i_a$, $i_b$, and $i_c$, into the d-axis current signal $i_d$ and the q-axis current signal $i_q$.

The d-axis and q-axis constant current output units 42a and 42b input the d-axis current signal $i_d$ and the q-axis current signal $i_q$, respectively, as the feedback values of the input current. The constant current control output units 42a and 42b further input from the constant current command value generator 41, a positive-phase-sequence current command value signal of the d-axis $i_{dp}*^r$ and a positive-phase-sequence current command value signal of the q-axis $i_{qp}*^r$, and according to a predetermined computation based on deviation signals between the d-axis and q-axis current signals $i_d$ and $i_q$, and the current command value signals $i_{dp}*^r$ and $i_{qp}*^r$, generate and output control signals $V_{dp}*^r$ and $V_{qp}*^r$ for controlling the input current to be a constant current value.

It is to be noted that the d-axis control performed by the constant current control output unit 42a is expressed by the formula (43), and the q-axis control performed by the constant current control output unit 42b is expressed by the formula (44).

The dq converter 84 converts the control values $V_{dp}*^r$ and $V_{ee}*^r$ into triaxial positive-phase signals ($V_{1ap}$, $V_{1bp}$, $V_{1cp}$), and thereafter inputs the converted signals in the adder 30.

In the adder 30, the adding part 31a adds the zero-phase-sequence voltage $e_{1o}$ calculated in the zero-phase-sequence voltage calculator 24, to the phase voltage signals ($e_{1an}$, $e_{1bn}$, $e_{1cn}$) of the negative-phase-sequence components obtained by the conversion in the dq-axis converter 82. The adding part 31b further adds the positive-phase-sequence components of the phase voltage signals ($V_{1ap}$, $V_{1bp}$, $V_{1cp}$) obtained by the conversion in the dq-axis converter 84, to the signals obtained by adding the phase voltage signals ($e_{1an}$, $e_{1bn}$, $e_{1cn}$) to the zero-phase-sequence voltage $e_{1o}$ calculated in the adding part 31a, generates three-phase voltage signals ($V_d$, $V_e$, $V_f$), and outputs the generated signals to the three-phase PWM control pulse generator 200b.

The three-phase PWM control pulse generator 200b generates gate control signals for controlling the three-phase PWM circuit 200a based on the three-phase voltage signals ($V_d$, $V_e$, $V_f$), compares the generated signals with triangle wave signals generated from a carrier frequency generator (not illustrated), generates gate pulse signals by the PWM (Pulse Width Modulation) conversion, and outputs the gate pulse signals to each of the gates of the semiconductor switching elements of the three-phase PWM circuit 200a so as to perform ON/OFF control on each of the gates.

Next, operations of the unbalanced voltage compensator 1 in the balanced state and in the unbalanced state will be explained. It is to be noted here that the unbalanced state includes the state where the voltage is reduced within a short period (instantaneous voltage drop), and further it includes the state where unbalance occurs in the three-phase voltages for a long period of time. Here, it is assumed that the load amount in the DC load 300 is constant.

[Operations in the Balanced State]

Figure 17:
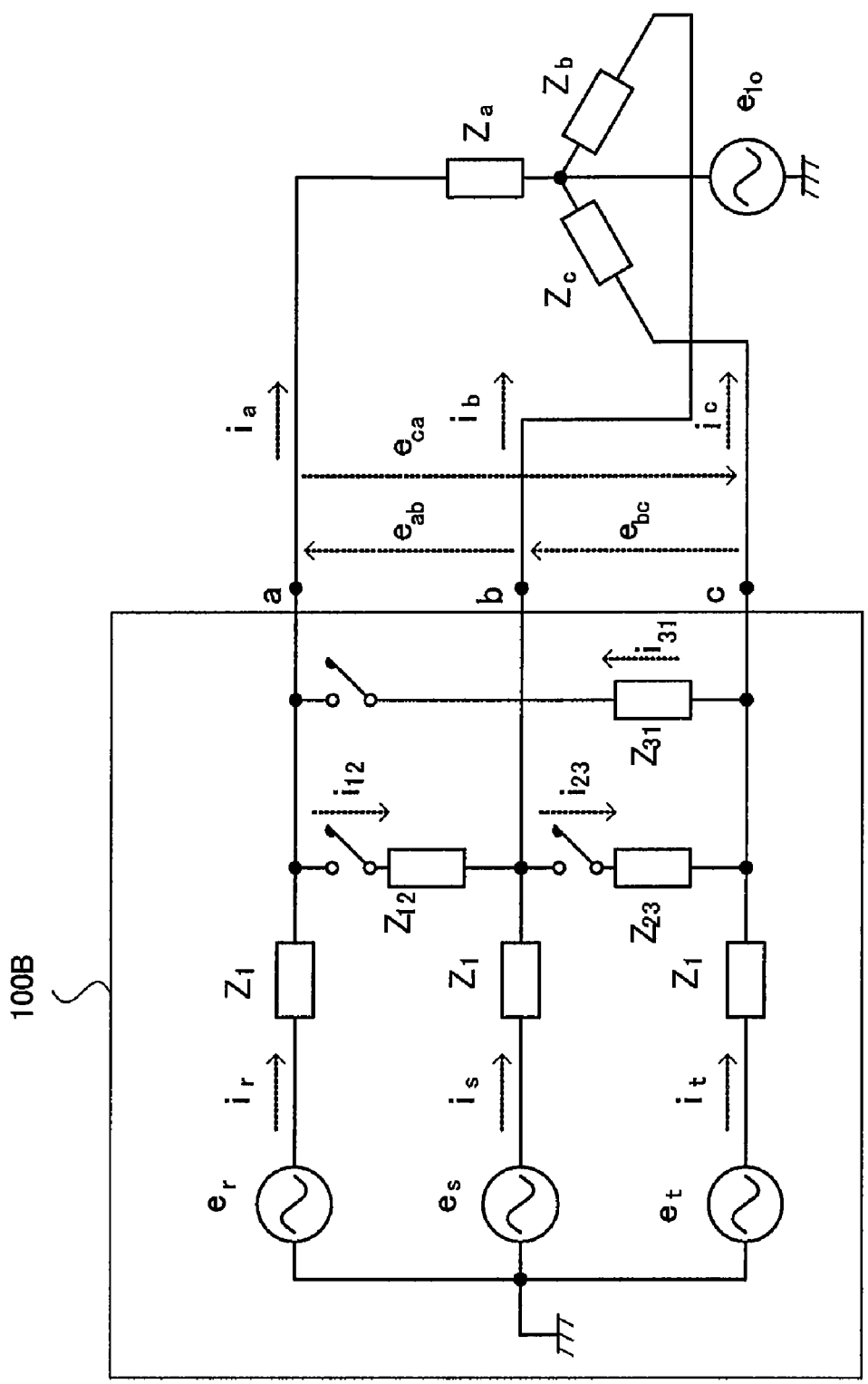
FIG. 17 illustrates an equivalent circuit in the event of voltage sag.
Figure 18:
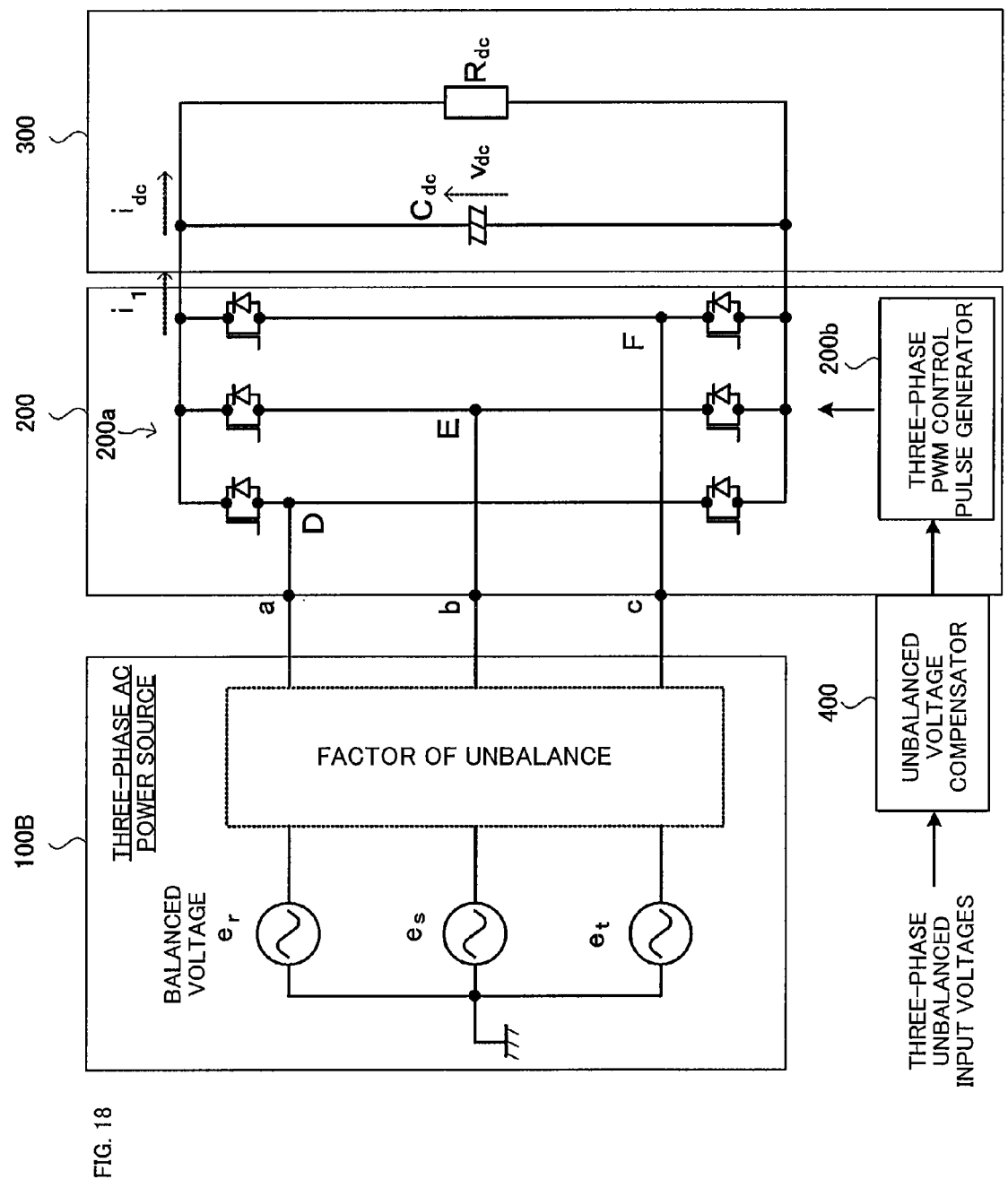
FIG. 18 illustrates equivalent circuits, respectively on the input side and on the load side of the three-phase converter.

In the state before the instantaneous voltage drop occurs, the three-phase AC input voltages from the three-phase AC power source 100 are in the state of being balanced. In this balanced state, as shown in FIG. 17, the three-phase voltage signals $e_r$, $e_s$, $e_t$ correspond to the positive-phase-sequence voltage $e_{1p}$ only, and at this time, the d-axis voltage signal $e_{1d}$ expressed in the formula (21) becomes $E_{1pm}$, and the q-axis voltage signal $e_{1q}$ becomes zero. Here, since $Z_{12}$, $Z_{23}$, and $Z_{31}$ are open, the phase delay due to $Z_{12}$ is ignorable. Therefore, it can be determined that the formulas (1), (2), and (3) correspond to the formula (17), and $\alpha = 0$ is established.

On this occasion, the signals $i_{dp}*^r$, $i_{qp}*^r$ of the current command values are expressed by the following formula (45) according to the formula (42):

$$i_{dp}*^r = (2/3) \cdot (P_{ave}/E_{1pm})$$

$$i_{qp}*^r = 0 \qquad (45)$$

Since the command value current signal $i_{qp}*^r$ is zero, current control is performed from the constant current command value generator 41 so that the input power factor is controlled to be 1. According to the DC voltage control unit 53, the DC output voltage is controlled to be a constant value, and therefore, constant DC power is outputted regularly to the DC load 300 side.

[Operations in the Unbalanced State]

Next, an explanation will be made regarding the unbalanced state where at least one-phase AC input voltage out of the three-phase AC input voltages from the three-phase AC power source 100 becomes the state of instantaneous voltage drop and the AC input voltages become unbalanced.

When the instantaneous voltage drop occurs in the AC input voltages, the positive-phase-sequence voltage calculator 21 of the symmetric coordinate component calculator 20 outputs the positive-phase-sequence components $e_{1dp}$, $e_{1qp}$ of the d-axis and the q-axis voltage signals, the negative-phase-sequence voltage calculator 22 outputs the negative-phase-sequence components $e_{1dn}$, $e_{1qn}$ of the d-axis and the q-axis voltage signals, and the zero-phase-sequence voltage calculator 24 outputs the zero-phase-sequence component $e_{1o}$.

The constant current control output units 42a and 42b add the positive-phase-sequence voltage components $e_{1dp}$, $e_{1qp}$ of the d-axis and the q-axis voltage signals to the current command value signals. The negative-phase-sequence components $e_{1dn}$, $e_{1qn}$ of the d-axis and q-axis voltage signals are further added via the adding parts 31a and 31b, to generate the output signals ($V_d$, $V_e$, $V_f$), and the current control is performed from the constant current command value generator 41 so that the input power factor becomes 1. In addition, the DC voltage control unit 53 controls the DC output voltage to be a constant value, whereby the constant DC power is outputted regularly on the DC load 300 side.

By adding the zero-phase-sequence component $e_{1o}$ to the negative-phase-sequence component and the positive-phase-sequence component, the zero-phase-sequence component of the power source voltage is superimposed on the output signals ($V_d$, $V_e$, $V_f$), and a control signal for the three-phase PWM converter is generated based on the output signal on which the zero-phase-sequence component is superimposed, allowing the three-phase AC input voltages to compensate for the instantaneous voltage drop.

The present invention subjects the vector operation to the line voltages acquired at one measurement point of time, thereby acquiring the phase voltages of three phases as described above, performs the constant current control according to the PFC control based on the positive-phase-sequence voltage and the negative-phase-sequence voltage of the phase voltages, further calculating the zero-phase-sequence voltage from the phase voltages, and superimposing the zero-phase-sequence voltage on the positive-phase-sequence voltage and the negative-phase-sequence voltage, thereby compensating for the unbalance.

In the unbalanced voltage compensation according to the present invention, the line voltages acquired at one measurement point of time are used as original signals for calculating the zero-phase-sequence voltage. Therefore, it is possible to acquire a control signal for compensating for the unbalance from the measurement value acquired at one measurement point of time.

Typically, for detecting voltage fluctuations of the phase voltage, at least a half cycle of time interval is necessary. Therefore, a measured value at just one measurement point of time is not enough for detecting and compensating for the unbalanced state, and measured values obtained at multiple measurement points of time are required. On the other hand, in the present invention, the line voltages acquired at one measurement point of time are subjected to the vector operation, thereby obtaining the positive-phase-sequence voltage and the negative-phase-sequence voltage of the phase voltages, and the zero-phase-sequence voltage can be calculated from the positive-phase-sequence voltage and the negative-phase-sequence voltage. Accordingly, it is possible to generate a signal for compensating for the unbalance, from only the values acquired at one measurement point of time.

The acquisition of the line voltages and the unbalanced voltage compensation based on the acquired line voltages are not limitedly based on the values acquired at one measurement point of time. Alternatively, the acquisition of the line voltages and the unbalance compensation are sequentially repeated, thereby not only compensating for the instantaneous voltage drop, but also compensating for the unbalanced state of the voltages for a long term.

Next, with reference to FIG. 8 and FIG. 9, a configuration example of the present invention will be explained as to the unbalanced voltage compensation in which the unbalanced voltage compensating operation is performed by an arithmetic processing by the CPU according to software.

The unbalanced voltage compensator 1 of the present invention is able to implement the functions of instantaneous voltage drop compensation and the power conversion, by means of the circuit configuration. Alternatively, it is able to implement the functions of instantaneous voltage drop compensation and the power conversion by allowing the CPU to execute a program.

Figure 8:
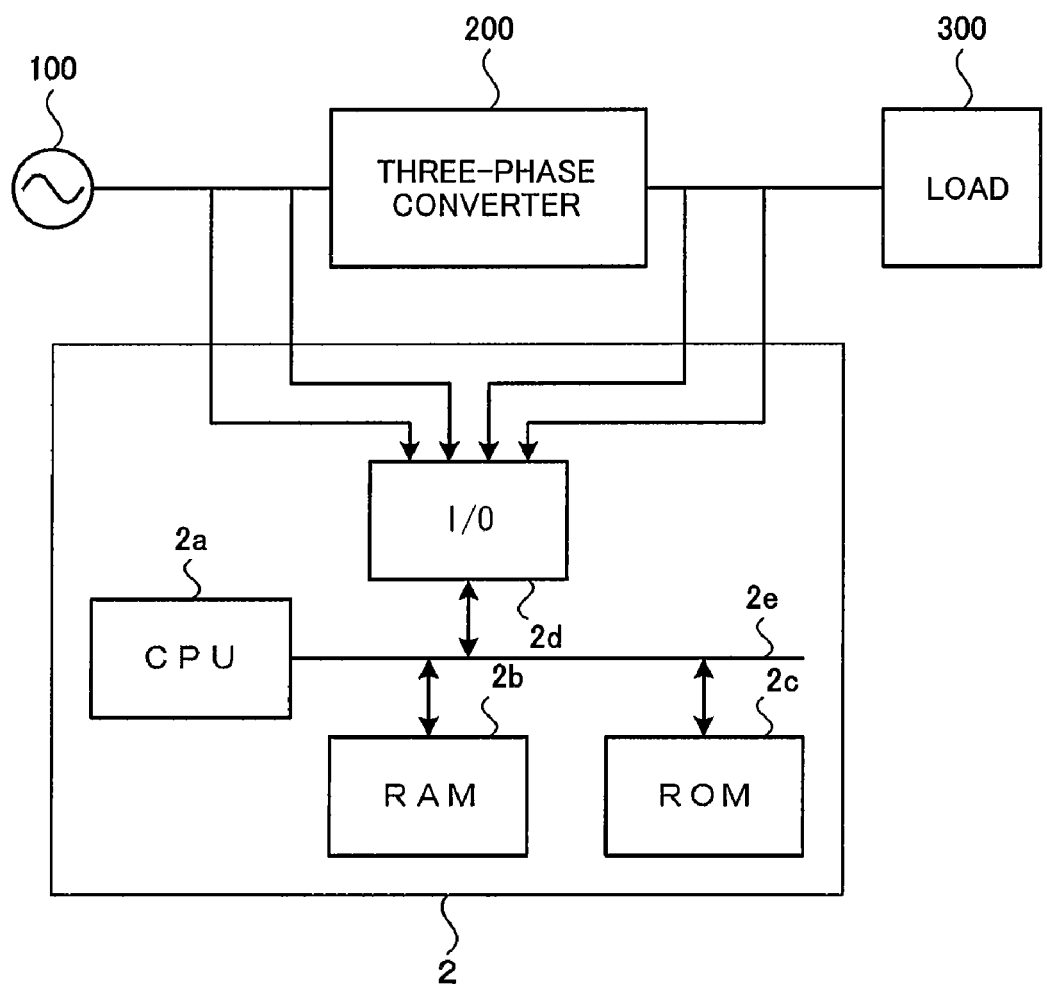
FIG. 8 illustrates a configuration example to explain that the unbalanced voltage compensating operation of the present invention is performed by an arithmetic processing of the CPU according to software.

FIG. 8 illustrates a configuration example in the case where the unbalanced voltage compensator of the present invention is implemented by the CPU and software. Hereinafter, the unbalanced voltage compensator implemented by the configuration of the CPU and software will be explained, with the reference numeral 2 being appended.

As shown in FIG. 8, in the three-phase AC power supplied from the three-phase AC power source 100, the three-phase PWM converter 200 subjects the three-phase AC voltages to the PWM conversion and outputs DC voltage to the DC load 300. The computer control unit 2 has a function of the unbalanced voltage compensation, and controls the three-phase converter 200 to perform power conversion and unbalanced voltage compensation.

The computer control unit 2 is provided with the CPU (Central Processing Unit) 2a, RAM (Random Access Memory) 2b, ROM (Read Only Memory) 2c, and I/O unit 2d, and each of the elements are connected via a bus 2e.

The CPU 2a conducts centralized control over each of the elements of the computer control unit 2. The CPU 2a develops a designated program in the RAM 2b, out of system programs and various application programs stored in the ROM 2c, and executes various processing in cooperation with the program being developed in the RAM 2b.

The CPU 2a controls the three-phase PWM pulse generator provided in the three-phase converter 200 in cooperation with the power conversion control program, thereby converting the three-phase AC input power inputted from the three-phase AC power source 100 into DC output power, and compensating for the unbalanced voltages of the AC input voltage.

The RAM 2b is a volatile-type memory for storing various information items, and has a work area to develop various data and programs. The ROM 2c is a memory for storing various information items in readable manner, and stores the power conversion control program for controlling the three-phase converter.

The I/O unit 2d handles inputting and outputting of various signals with the three-phase converter 200. The I/O unit 2d inputs the line voltages and the a-phase and c-phase AC input current on the three-phase AC input side, as well as the DC output current and the DC output voltage on the DC output side. The I/O unit 2d further outputs a gate pulse signal for controlling semiconductor-switching elements of the three-phase bridge circuit in the three-phase converter 200.

Next, with reference to FIG. 9, an explanation will be made as to the operations according to the program control by the computer control unit 2.

In the computer control unit 2, for example, outputting of the three-phase AC power from the three-phase AC power source 100 triggers reading of the power conversion control program from the ROM 2c and developing the program in the RAM 2b, and then processing for the power conversion control and unbalanced voltage compensation is executed in cooperation with the CPU 2a.

Figure 9:
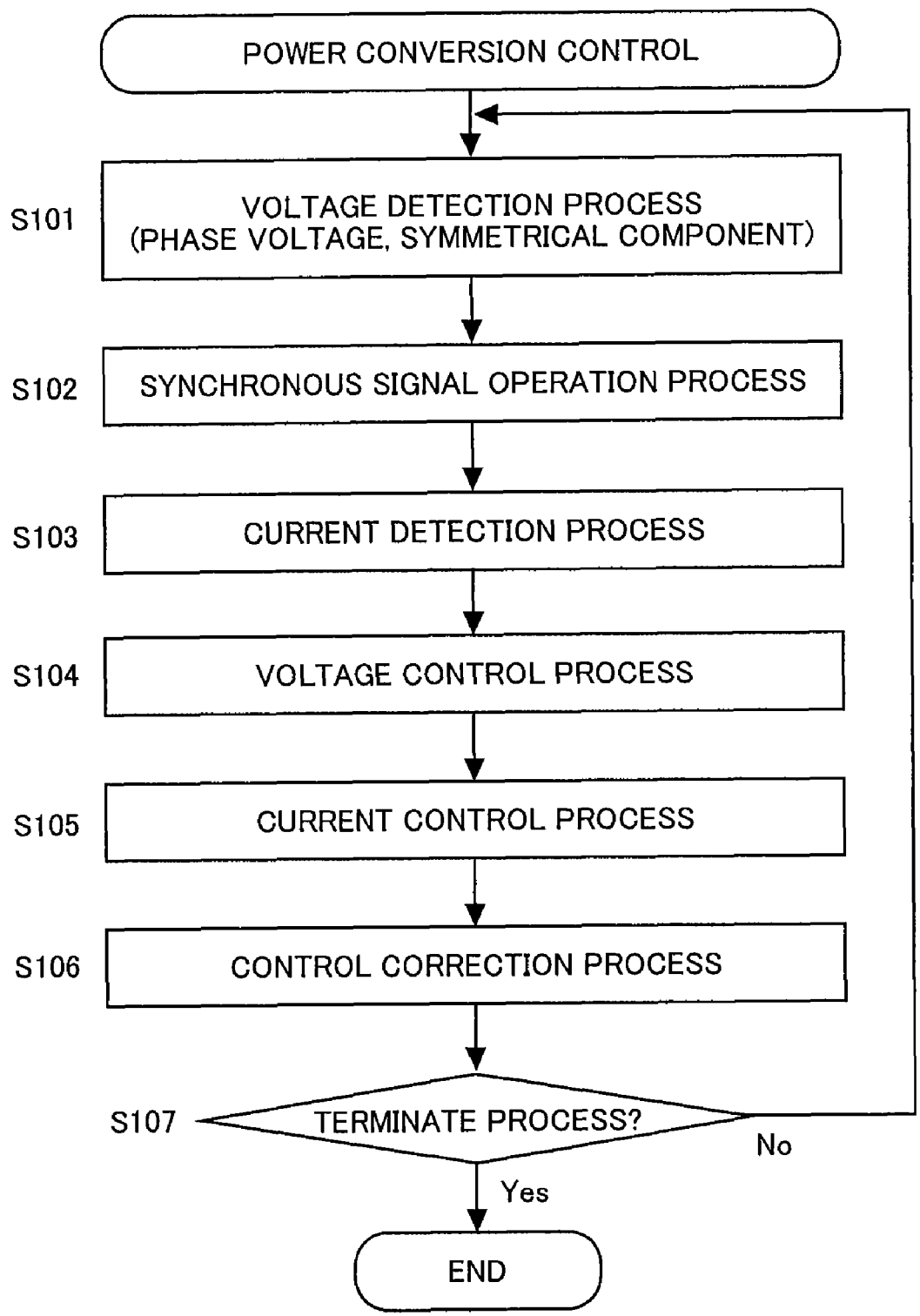
FIG. 9 is a flowchart to explain that the unbalanced voltage compensating operation of the present invention is performed by an arithmetic processing of the CPU according to software.

As shown in the flowchart in FIG. 9, firstly the voltage detecting process is performed (S101). In the step of S101, three-phase AC voltages are acquired via the I/O unit 2d, line voltage signals $e_{ab}$, $e_{bc}$, $e_{ca}$ of the three-phase AC voltages being acquired are detected, and then phase voltage signals $e_{2a}$, $e_{2b}$, $e_{2c}$ are calculated according to the centroid vector operation. In the configuration example as shown in FIG. 7, for example, the centroid vector operation is performed in the centroid vector operation unit 10.

The phase voltage signals $e_{2a}$, $e_{2b}$, $e_{2c}$ of three phases being calculated are converted into the d-axis voltage signal $e_{1d}$ and the q-axis voltage signal $e_{1q}$, being two phases. The positive-phase-sequence components $e_{1dp}$, $e_{1qp}$ and the negative-phase-sequence components $e_{1dn}$, $e_{1qn}$ are separated and obtained from the d-axis and q-axis voltage signals $e_{1d}$, $e_{1q}$ being converted. Then, the negative-phase-sequence components $e_{1dn}$, $e_{1qn}$ of the d-axis and q-axis voltage signals $e_{1d}$, $e_{1q}$, are converted into the phase voltage signals $e_{1an}$, $e_{1bn}$, $e_{1cn}$ in three phases. The processes in the step of S101 correspond to the processes performed in the line voltage detector 62, the centroid vector operation unit 10, the dq-axis converter 81, the positive-phase-sequence voltage calculator 21, the negative-phase-sequence voltage calculator 22, the phase calculator 23 for calculating the zero phase $\phi_o$, and the zero-phase-sequence voltage calculator 24.

Each of the processes in step S101 may be performed in parallel as appropriate. In the following steps S102 to S106, such parallel processing as performed in step S101 may also be performed in the same manner.

In the step of S102, a synchronous signal calculation process is performed. A synchronous signal "s" is generated from the phase signals $e_{2a}$, $e_{2b}$, and $e_{2c}$ in three phases. The synchronous signal "s" may be obtained from the zero cross point of any of the phase voltages of the phase voltage signals $e_{2a}$, $e_{2b}$, and $e_{2c}$, for instance. The synchronous signal can be generated by comparing the phase voltage with the zero voltage and outputting the synchronous signal "s" at the point when the phase voltage becomes equal to the zero voltage. In the configuration example as shown in FIG. 7, the synchronous signal generator 70 can generate the signal by using the output signals ($e_{2a}$, $e_{2b}$, $e_{2c}$) from the centroid vector operation unit 10, and it is possible to configure this operation by a comparison circuit which compares the output signal $e_{2a}$ with the zero voltage, for instance. Alternatively, the synchronous signal may be generated at an arbitrary point of time and this synchronous signal can be assumed as an initial value of the synchronous signal "s".

The synchronous signal "s" is used for synchronization in the dq-axis conversion including the two-phase to three-phase conversion and three-phase to two-phase conversion in each of the steps S101, S103, and S106. On this occasion, the synchronization is performed by using the synchronous signal "s" obtained in the step S102 executed just before, or the synchronous signal "s" being the initial value. Therefore, the step of S102 corresponds to the processing performed in the synchronous signal generator 70.

Next, a current detection process is performed in the step of S103. In the step of S103, three-phase AC input current signals $i_a$, $i_b$, $i_c$ being inputted via the I/O unit 2d are detected, and converted into the d-axis current signal $i_d$, and the q-axis current signal $i_q$. The process in the step of S103 corresponds to the processes performed in the current detector 64 and in the dq-axis converter 83.

Next, a voltage control process is performed in the step S104. In the step of S104, the DC output current signal $i_{dc}$ and the DC output voltage signal $v_{dc}$ are detected via the I/O unit 2d. The detected DC output current signal $i_{dc}$ is multiplied by the detected DC output voltage signal $v_{dc}$, thereby calculating the DC output power signal $P_{dc}$. The DC output voltage signal $v_{dc}$ is subtracted from the DC voltage command value signal $V_{dc}*^r$, calculating a deviation signal, and a DC voltage control signal for controlling the DC output voltage signal $v_{dc}$ to be a constant voltage value is generated from the deviation signal being calculated. Then, the DC voltage control signal is added to the DC output power signal $P_{dc}$ to generate an average power signal $P_{ave}$. The processes in the step S104 correspond to the processes performed in the current detector 66, the voltage detector 68, the subtractor 52, the multiplier 51, the DC voltage control unit 53, and the adder 54.

Next, a current control process is performed in the step S105. In the step of S105, current command value signals $i_{1dp}*^r$, $i_{1qp}*^r$ are generated, based on the average power signal $P_{ave}$ generated in the step S104 and positive-phase-sequence components $e_{dp}$, $e_{qp}$ of the d-axis and q-axis voltage signals, obtained by positive-negative phase separation in the step S101, a current control signal is generated by using the current command value signals $i_{1dp}*^r$, $i_{1qp}*^r$ and the d-axis current signal $i_d$ and the q-axis current signal $i_q$, which are converted and obtained by the dq converter. The processes of S105 correspond to processes performed by the constant current command value generator 41 and the constant current control output units 42a and 42b.

Next, a control correction process is performed in the step S106. In the step S106, the input current control signal generated in the step S105 is added to the positive-phase-sequence components $e_{1dp}$, $e_{1qp}$ of the d-axis and q-axis voltage signals obtained by positive-phase and negative-phase separation in the step S101, the output signals $v_{dp}*^r$, $v_{qp}*^r$ expressed in the formula (42) and formula (43) are generated, and two-phase output signals $v_{dp}*^r$, $v_{qp}*^r$ are converted into the three-phase control signals $V_{1ap}$, $V_{1bp}$, $V_{1cp}$. The phase voltage signals $e_{1an}$, $e_{1bn}$, $e_{1cn}$ acquired in the step S101 are added to the zero-phase voltage signal $e_{1o}$, then further added to the control signals $V_{1ap}$, $V_{1bp}$, $V_{1cp}$, thereby generating the gate control signals.

Then, triangle wave signals are generated, and by comparing the triangle wave signals with the gate control signals, thereby generating gate pulse signals. Subsequently, the gate pulse signals are outputted to each gate of the semiconductor switching elements of the three-phase PWM circuit 200a in the three-phase converter 200 via the I/O unit 2d.

The processes in the step S106 correspond to the processes performed in the adder 30, the dq-axis converter 83, the constant current control output units 42a, 42b, the dq-axis converter 84, and the three-phase PWM control pulse signal generator 200b.

In the step of S107, it is determined whether or not the power conversion control process and the unbalanced voltage compensation process are terminated. If those processes are not terminated, they are continued after returning to the step S101, and if it is determined to terminate the processes, those power conversion control process and the unbalanced voltage compensation process are terminated.

In the configuration for allowing the program to activate the CPU, similar to the case of the circuit configuration, it is possible to implement the functions of the unbalanced voltage compensation and the power conversion.

Subsequently, with reference to FIG. 10 to FIG. 15, an explanation will be made regarding experimental examples of the unbalanced voltage compensation according to the present invention. FIG. 10 to FIG. 15 illustrate measurement data, which is obtained when the three-phase converter is controlled by the unbalanced voltage compensator according to the configuration example as shown in FIG. 7.

Measurement is performed under the condition that the three-phase rated line voltage is 200 V, the three-phase rated line current is 17.5 A, the carrier frequency is 18.5 kHz, the DC link voltage (output voltage) is 380 V, the DC link capacity is 1,200 µF, the transmission line inductance is 300 µH, and the load resistance is 25Ω. Then, from the state where the three-phase rated line voltage is 200 V and the three-phase rated line current is 17.5 A, the voltage is suddenly dropped to the unbalanced voltage and then recovered. Under this condition, an influence is compared between the case where the unbalance in voltage is compensated for and the case there is no compensation. Here, the influence is represented by the fluctuations in the output voltage $V_{dc}$ and the input current $i_a$, $i_b$, $i_c$, which are caused by the three-phase unbalanced voltages generated by the instantaneous voltage drop, or the like. According to the results of the experiments, it is possible to check the effectiveness of the unbalanced voltage compensation control.

Figure 10A:
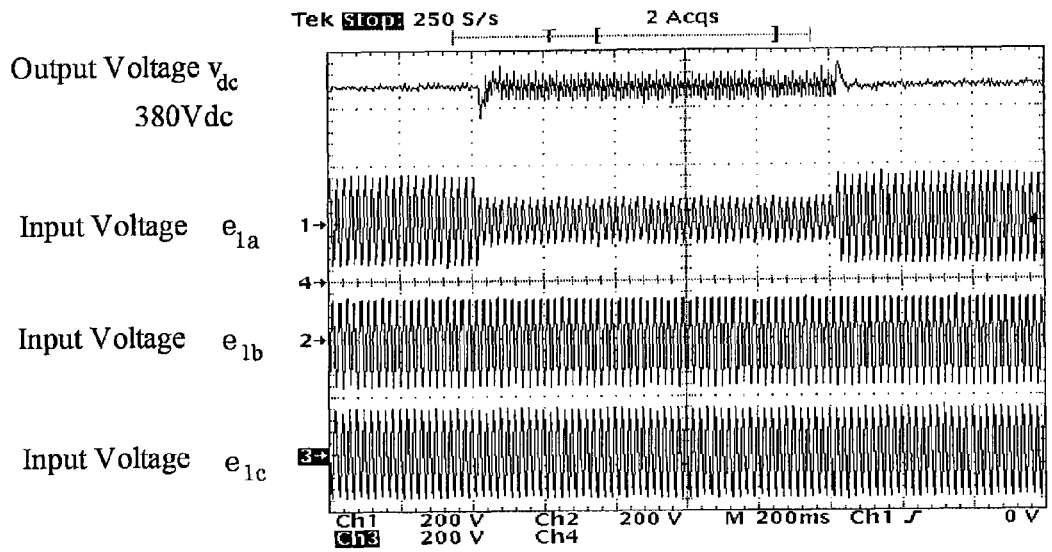
FIG. 10 illustrates experimental examples of the unbalanced voltage compensation according to the present invention.
Figure 10B:
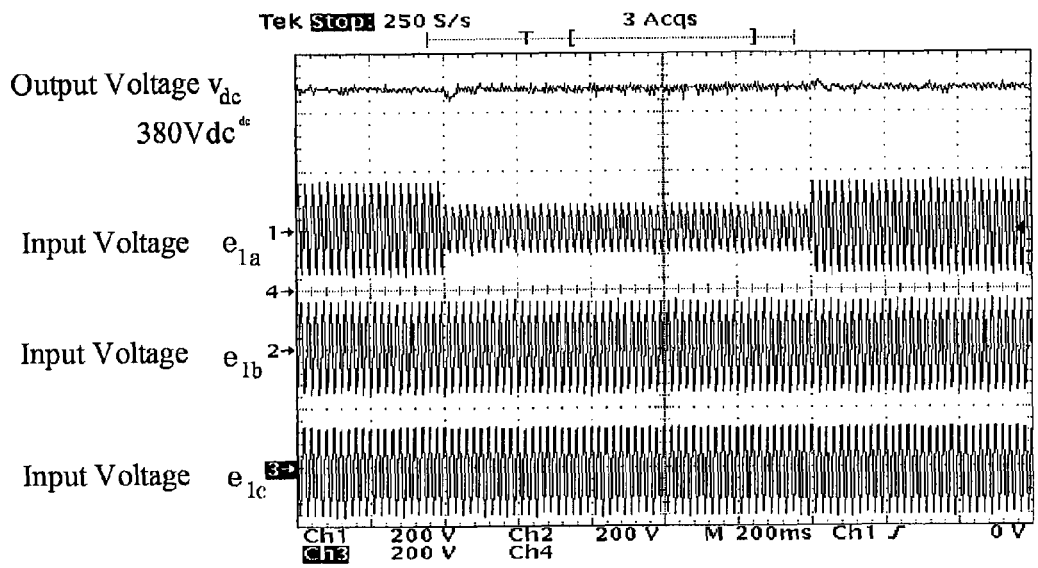

FIG. 10 shows characteristics in the case where the input phase voltage $e_{1a}$ suddenly dropped to 50%, and thereafter it was resumed to 100%. FIG. 10A illustrates the case where the unbalanced voltage compensation was not performed; and FIG. 10B illustrates the case where the unbalanced voltage compensation according to the present invention was performed. In the case where the unbalanced voltage compensation was performed, the output voltage $V_{dc}$ was kept constant, and there was shown a favorable performance.

Figure 11A:
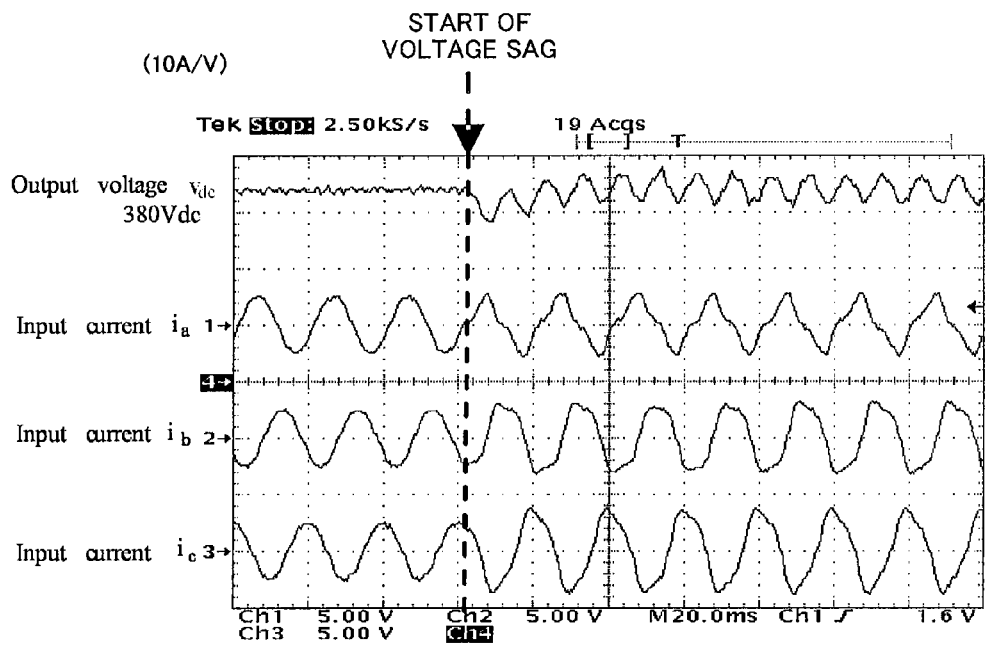
FIG. 11 illustrates experimental examples of the unbalanced voltage compensation according to the present invention.
Figure 11B:
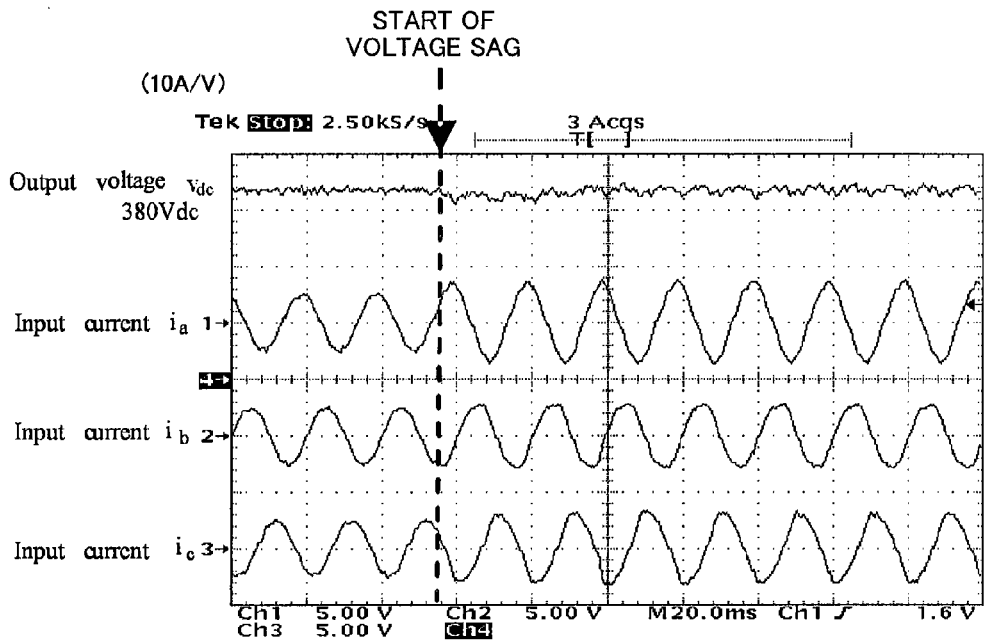
Figure 12A:
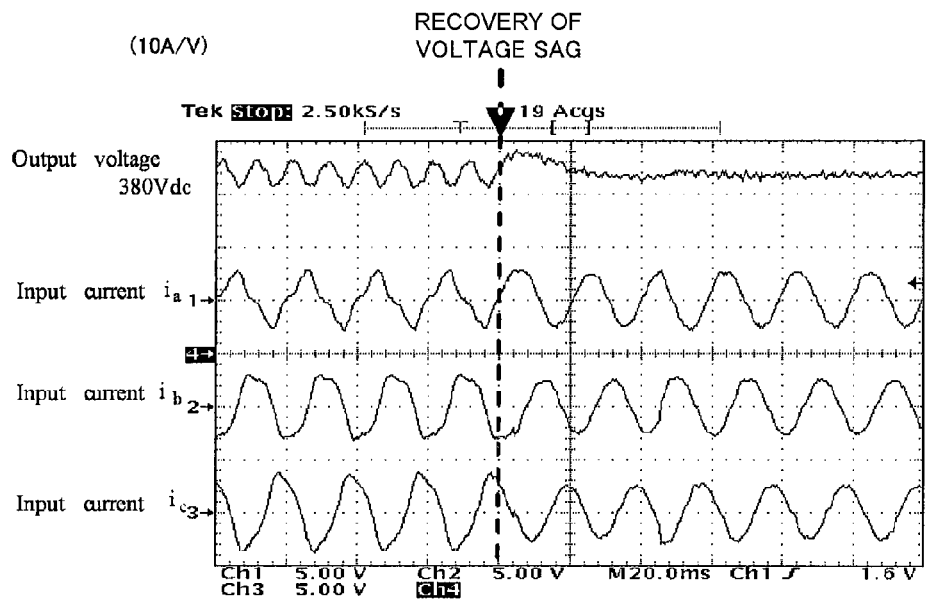
FIG. 12 illustrates experimental examples of the unbalanced voltage compensation according to the present invention.
Figure 12B:
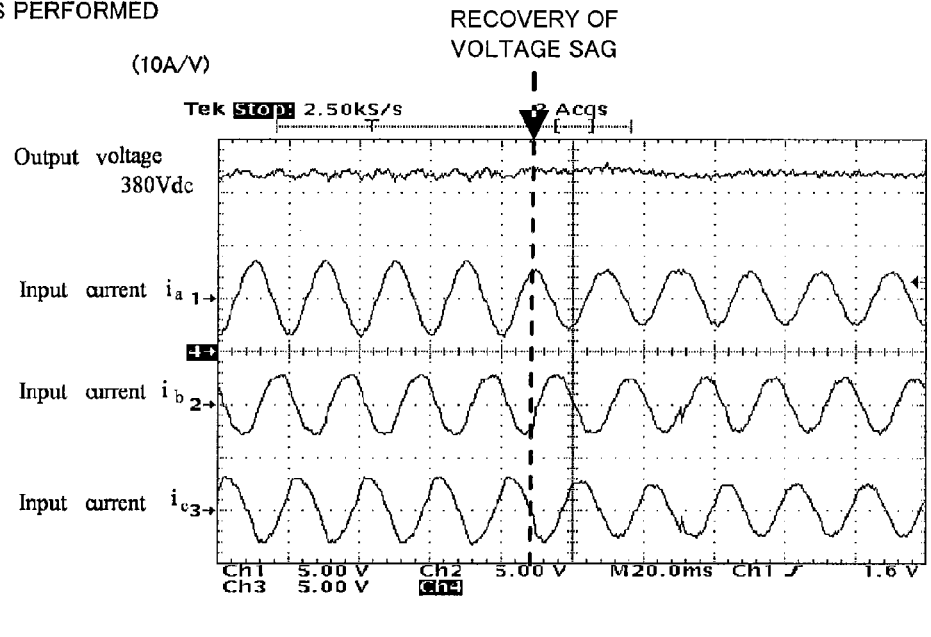

FIG. 11 and FIG. 12 are enlarged views of FIG. 10, and FIG. 11 illustrates the case where the input phase voltage $e_{1a}$ suddenly dropped from 100% to 50%; and FIG. 12 illustrates the case where the input phase voltage $e_{1a}$ recovered from 50% to 100%. FIG. 11A and FIG. 12A illustrate the case where the unbalanced voltage compensation was not performed; and FIG. 11B and FIG. 12B illustrate the case where the unbalanced voltage compensation according to the present invention was performed. It is possible to read from the figures that the input current $i_a$, $i_b$, $i_c$ made a high-speed response from the sudden change point.

Figure 13A:
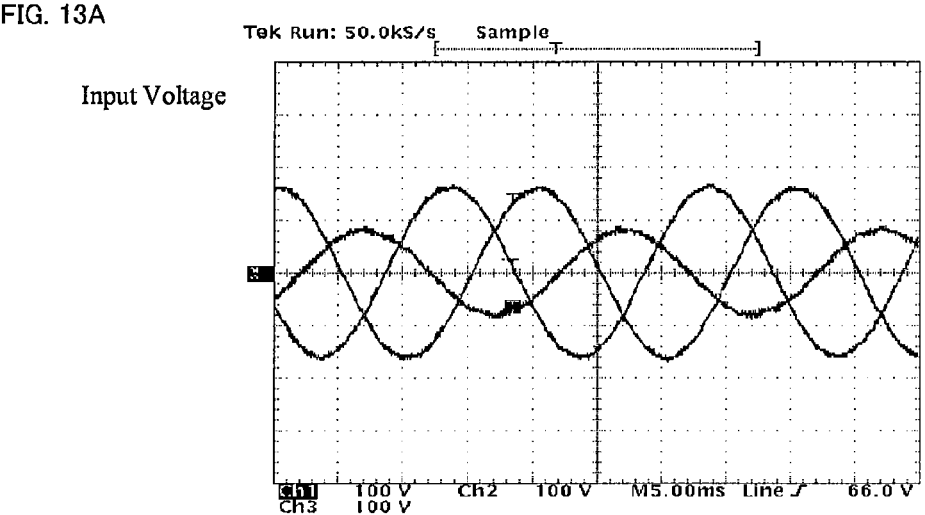
FIG. 13 illustrates experimental examples of the unbalanced voltage compensation according to the present invention.
Figure 13B:
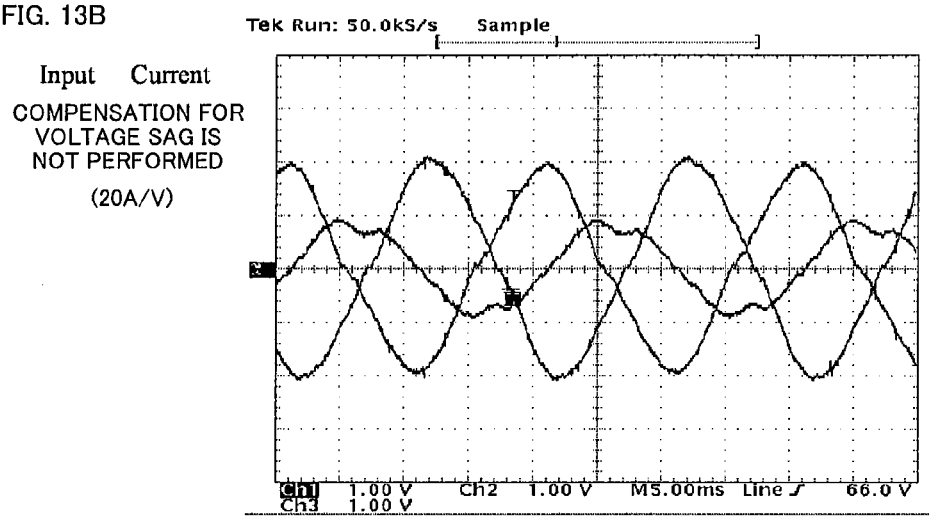
Figure 13C:
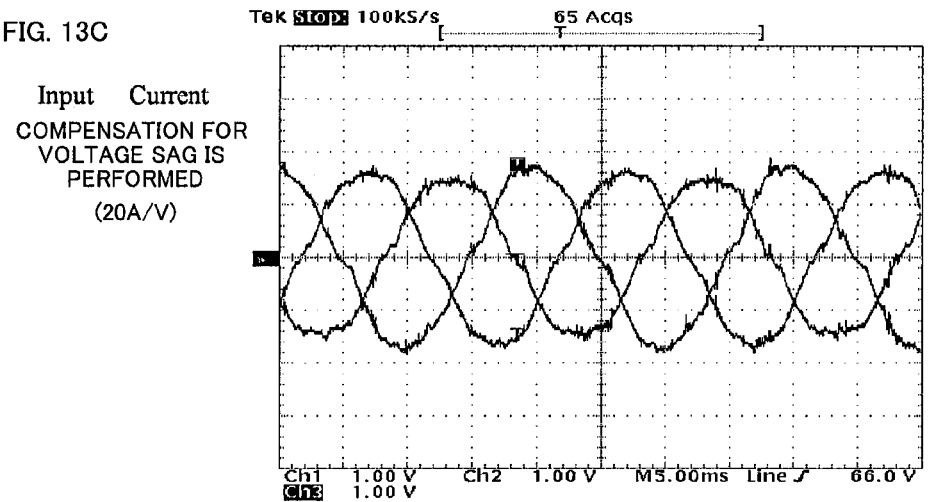

FIG. 13 illustrates a comparison of characteristics, when the input phase voltage $e_a$ of the three-phase AC power source 100 shown in FIG. 7 was dropped by 50%. FIG. 13A illustrates the input voltages, FIG. 13B illustrates the case where the unbalanced voltage compensation was not performed, and FIG. 13C illustrates the case where the unbalanced voltage compensation according to the present invention was performed.

As shown in FIG. 13B, when the unbalanced voltage compensation was not performed, it is found that there were a large unbalance in amplitude of input current and displacement of phase angle. On the other hand, as shown in FIG. 13C, it is found that an effect from the compensation control by performing the unbalanced voltage compensation of the present invention brought about a favorable balance both in amplitude of the input current and the phase angle.

Figure 14A:
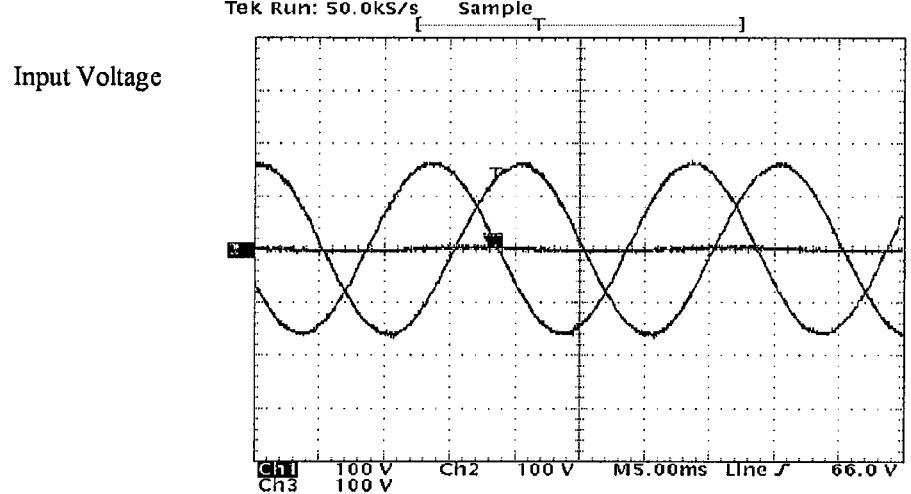
FIG. 14 illustrates experimental examples of the unbalanced voltage compensation according to the present invention.
Figure 14B:
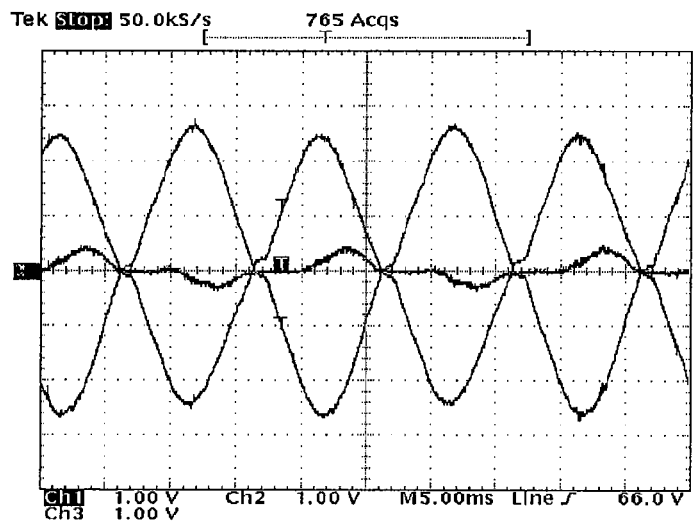
Figure 14C:
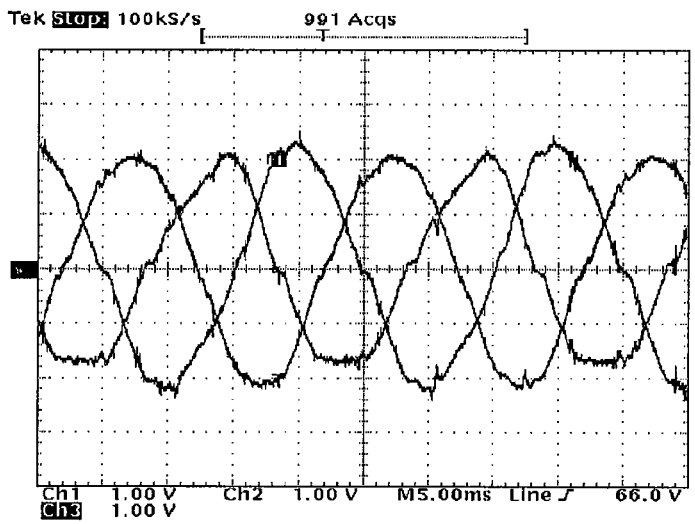

FIG. 14 illustrates the case that the input phase voltage $e_a$ from the three-phase AC power source 100 of FIG. 7 was dropped by 100% and reached zero voltage. FIG. 14A illustrates the input voltages, FIG. 14B illustrates the case where the unbalanced voltage compensation was not performed, and FIG. 14C illustrates the case where the unbalanced voltage compensation according to the present invention was performed.

The result of FIG. 14C shows that according to the unbalanced voltage compensation of the present invention, when the voltage sag occurred due to earth fault, that is, even when the input phase voltage $e_a$ of the three-phase AC power source 100 of FIG. 7 was dropped by 100% and reached the zero voltage, it is possible to keep the amplitude and the phase angle of the input current $i_a$, $i_b$, $i_s$ to be nearly balanced in three phases.

Figure 15:
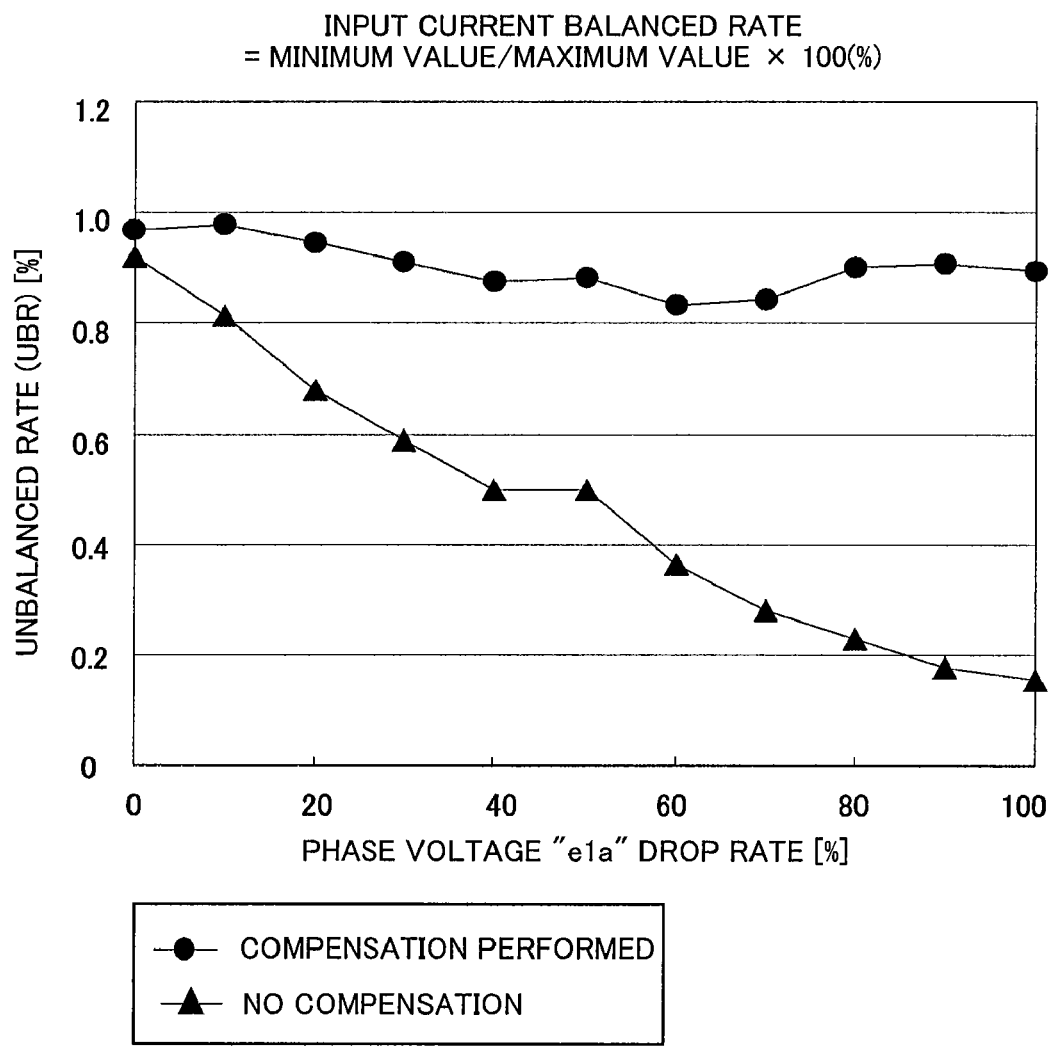
FIG. 15 illustrates an experimental example of the unbalanced voltage compensation according to the present invention.
Figure 16:
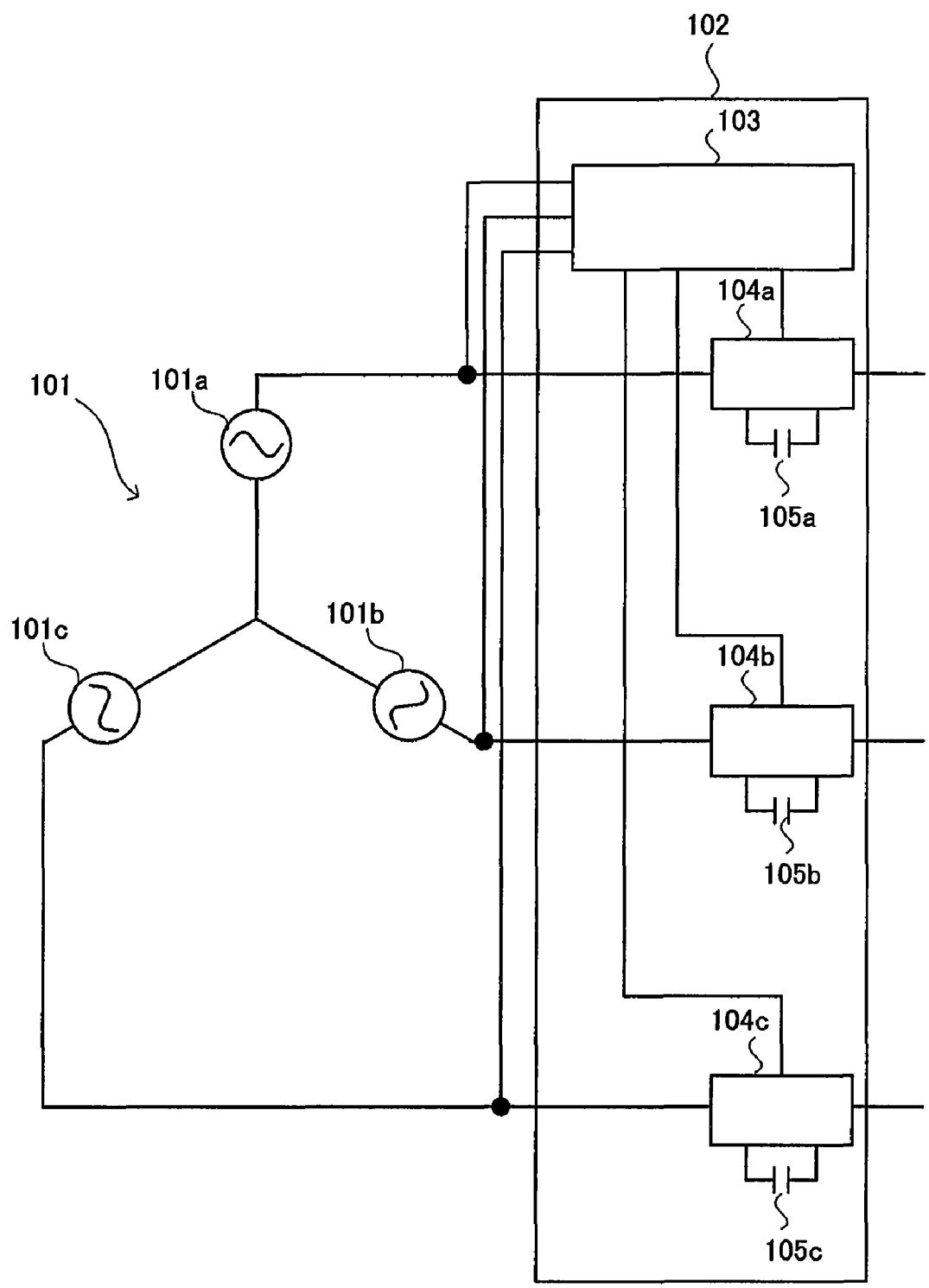
FIG. 16 illustrates a configuration example of a conventional voltage fluctuation compensator.

FIG. 15 illustrates an input phase voltage drop rate and an input current balanced rate. According to FIG. 15, in the case where the unbalanced voltage compensation was not performed (triangle marks in the figure), when the input phase voltage drop rate was 20%, the input current balanced rate was 67.9%. On the other hand, in the case where the unbalanced voltage compensation of the present invention was performed, favorable characteristics were shown as the following; when the input phase voltage drop rate was 20%, the input current balanced rate was 94.5%, and the input current balanced rate was kept in the range from 97.9% to 83.3% across the overall input phase voltage drop rate, from 0% to 100%.

The results above have been obtained by the experiment conducted by applying the unbalanced voltage compensation of the present invention to a representative 5 kW RF (Radio Frequency) generator, which is used as semiconductor manufacturing equipment, liquid crystal manufacturing equipment, or the like, and it is possible to achieve the performance which satisfies the voltage sag standard (SEMI F47-0200) (1) required in the semiconductor manufacturing equipment or the like.

By way of example, the maximum voltage drop rate and duration at the voltage sag, as defined in the voltage sag standard (SEMI F47-0200) (1): Percent of nominal voltage and duration of voltage sag in seconds are 50% and 0.2 seconds. As shown in the experimental result of FIG. 10 in association with this standard, when the experiment was conducted with the maximum voltage drop rate of 50% and the duration of 1 second in the event of voltage sag, the voltage reduction was able to be improved drastically by performing the voltage sag compensation according to the unbalanced voltage compensation of the present invention, though the voltage drop time in the measurement data was extended 5 times longer than the standard value (=1 second/0.2 seconds).

As described above, according to the unbalanced voltage compensation of the present invention, it is possible to compensate for the instantaneous voltage drop, and even at the time of instantaneous voltage drop of the input voltage, power is supplied stably to the DC load. Therefore, compared to the configuration of the instantaneous voltage drop compensation which utilizes a storage device such as a capacitor and a storage battery, it is possible to achieve a configuration for performing the instantaneous voltage drop compensation, being smaller in size, longer in life, and lower in cost. In addition, since the storage device method such as a capacitor and a storage battery is not employed, it is easy to do maintenance for the configuration of the instantaneous voltage drop compensation. Furthermore, since the power factor can be improved, a higher harmonic wave can be suppressed by the power factor improvement.

According to the unbalanced voltage compensation of the present invention, in particular when the PFC control is employed, there are advantages including the followings; there is little need of new plant and equipment spending, the size is drastically reduced by eliminating the storage device unit, and periodical maintenance of capacitor unit can be eliminated.

In addition, according to the unbalanced voltage compensation, even when there occurs an extreme voltage sag, i.e., in the event of nearly earth fault, it is possible to perform the unbalance compensation control as far as an active phase remains as a energy source.

The constant current command value generator generates current command value signals, from the positive-phase-sequence components of the d-axis and q-axis voltage signals based on the AC input voltages and the DC voltage control signal based on the DC output voltage, thereby enabling a quick response by the input current command signal against the fluctuations of the AC input voltages, and excessive fluctuations of the DC output voltage can be suppressed.

On the output side, the current detector, the voltage detector, and the adder detect a DC output power signal, and the adder adds the DC output power signal to the DC voltage control signal, whereby the average power operation unit allows a quick response against the load amount fluctuations of the DC load which outputs the DC output power, and suppresses the excessive fluctuations of the DC output voltage.

The synchronous signal generator generates a synchronous signal, and each of the dq-axis converters performs the conversion according to the synchronous signal "s", from three-phase to two-phase or from two-phase to three-phase, thereby constantly keeping the power factor to 1, regardless of whether the AC input voltages are balanced or unbalanced.

In addition, the centroid vector operation unit of the present invention detects the line voltage signals of the AC input voltages and converts the signals to phase voltages, and therefore, it is possible to compensate for the instantaneous voltage drop at every measurement point of time, regardless of whether the AC system of the three-phase AC power source is three-phase three-wire system, or three-phase four-wire system.

It should be understood that disclosed embodiments and the descriptions of the modification examples are just examples of the instantaneous voltage drop compensator, the instantaneous voltage drop compensation method, and the instantaneous voltage drop compensation program, and the present invention is not limited to those embodiments, and it is susceptible of changes and modifications without departing from the scope of the invention. Therefore, such modifications fall within the ambit of the present invention.

The present invention can be applied to a facility which requires a stable power supply being small in voltage fluctuations on the load side, such as semiconductor manufacturing equipment, in particular.

What is claimed is:

1. An unbalanced voltage compensation method in power conversion for subjecting three-phase AC voltages to PWM conversion and outputting DC voltage, comprising, a centroid vector operation step for obtaining wye-phase voltages which are 120° out of phase with each other, from line voltages of the three-phase AC voltages, a symmetrical component calculation step for calculating symmetrical component voltages of a three-phase balanced system, from the wye-phase voltages that are obtained by the centroid vector operation step, and an unbalanced voltage compensation step for forming a compensation signal for compensating for unbalanced voltages of three-phase AC voltages, and subjecting the three-phase AC voltages to the PWM conversion to generate a control signal for outputting the DC voltage, wherein, the centroid vector operation step performs a vector operation as to all combinations of two line voltages which are selected from the line voltages, obtains centroid vector voltages which are directed to respective terminal voltages from a terminal-voltage centroid according to the vector operation, and renders the vector voltages respectively as the wye-phase voltages which are 120° out of phase with each other, and the unbalanced voltage compensation step generates the compensation signal for compensating for the unbalanced voltages of the three-phase AC voltages based on a zero-phase-sequence voltage of the symmetrical component voltages which are obtained in the symmetrical component calculation step, obtains wye-phase voltages based on the symmetrical component voltages and the compensation signal, the wye-phase voltages being 120° out of phase with each other as to which the unbalanced voltages have been compensated for, and subjects the three-phase AC voltages to the PWM conversion based on the wye-phase voltages to generate the control signal for outputting the DC voltage.

2. The unbalanced voltage compensation method according to claim 1, wherein, the symmetrical component calculation step subjects each of the wye-phase voltages obtained in the centroid vector operation step to dq-axis conversion to calculate a d-axis voltage signal and a q-axis voltage signal, subjects the d-axis voltage signal and the q-axis voltage signal being calculated to frequency separation, obtains a positive-phase-sequence voltage from a DC component, and calculates a negative-phase-sequence voltage from an AC component.

3. The unbalanced voltage compensation method according to claim 1 or claim 2, wherein, the symmetrical component calculation step calculates the zero-phase-sequence voltage according to amplitude calculated from the negative-phase-sequence voltage and a phase calculated from the positive-phase-sequence voltage and the negative-phase-sequence voltage.

4. The unbalanced voltage compensation method according to either of claim 1 or claim 2, wherein, actual measurement values of the line voltages correspond one-to-one with the control signal, and one control signal is generated based on the actual measurement values of the line voltages at one measurement point of time.

5. The unbalanced voltage compensation method according to claim 3, wherein, actual measurement values of the line voltages correspond one-to-one with the control signal, and one control signal is generated based on the actual measurement values of the line voltages at one measurement point of time.

6. An unbalanced voltage compensator in power conversion for subjecting three-phase AC voltages to PWM conversion and outputting DC voltage, comprising, a centroid vector operation unit for obtaining wye-phase voltages which are 120° out of phase with each other, from line voltages of the three-phase AC voltages, a symmetrical component calculation unit for calculating symmetrical component voltages of a three-phase balanced system, from the wye-phase voltages that are obtained by the centroid vector operation unit, and an unbalanced voltage compensation unit for forming a compensation signal for compensating for unbalanced voltages of three-phase AC voltages, and subjecting the three-phase AC voltages to the PWM conversion to generate a control signal for outputting the DC voltage, wherein, the centroid vector operation unit performs a vector operation as to all combinations of two line voltages which are selected from the line voltages, obtains centroid vector voltages which are directed to respective terminal voltages from a terminal-voltage centroid, and renders the vector voltages respectively as the wye-phase voltages which are 120° out of phase with each other, thereafter outputting the voltages, and the unbalanced voltage compensation unit generates and outputs the compensation signal for compensating for the unbalanced voltages of the three-phase AC voltages based on the zero-phase-sequence voltage of the symmetrical component voltages which are obtained in the symmetrical component calculation unit, obtains the wye-phase voltages based on the symmetrical component voltages and the compensation signal, the wye-phase voltages being 120° out of phase with each other as to which the unbalanced voltages have been compensated for, and subjects the three-phase AC voltages to the PWM conversion based on the wye-phase voltages to generate the control signal for outputting the DC voltage.

7. The unbalanced voltage compensator according to claim 6, wherein, the symmetrical component calculation unit subjects each of the wye-phase voltages obtained in the centroid vector operation unit to dq-axis conversion to calculate a d-axis voltage signal and a q-axis voltage signal, subjects the d-axis voltage signal and the q-axis voltage signal being calculated to frequency separation, obtains a positive-phase-sequence voltage from a DC component, calculates a negative-phase-sequence voltage from an AC component, and outputs the positive-phase-sequence voltage and the negative-phase-sequence voltage to the unbalanced voltage compensation unit.

8. The unbalanced voltage compensator according to claim 6 or claim 7, wherein, the symmetrical component calculation unit calculates the zero-phase-sequence voltage according to amplitude calculated from the negative-phase-sequence voltage and a phase calculated from the positive-phase-sequence voltage and the negative-phase-sequence voltage, and outputs the zero-phase-sequence voltage to the unbalanced voltage compensation unit.

9. The unbalanced voltage compensator according to claim 6 or claim 7, wherein, the unbalanced voltage compensation unit generates one control signal with respect to actual measurement values of the line voltages at one measurement point of time.

10. The unbalanced voltage compensator according to claim 8, wherein, the unbalanced voltage compensation unit generates one control signal with respect to actual measurement values of the line voltages at one measurement point of time.

11. A three-phase converter control method, the converter subjecting three-phase AC voltages to PWM conversion and outputting DC voltage, comprising, a centroid vector operation step for obtaining from line voltages, wye-phase voltages which are 120° out of phase with each other, a symmetrical component calculation step for calculating symmetrical component voltages of a three-phase balanced system, from the wye-phase voltages that are obtained by the centroid vector operation step, and an unbalanced voltage compensation step for forming a compensation signal for compensating for unbalanced voltages of three-phase AC voltages, and subjecting the three-phase AC voltages to the PWM conversion to generate a control signal for outputting the DC voltage, wherein, the centroid vector operation step performs a vector operation as to all combinations of two line voltages which are selected from the line voltages, obtains centroid vector voltages which are directed to respective terminal voltages from a terminal-voltage centroid according to the vector operation, and renders the vector voltages respectively as the wye-phase voltages which are 120° out of phase with each other, the unbalanced voltage compensation step generates the compensation signal for compensating for the unbalanced voltages of the three-phase AC voltages based on a zero-phase-sequence voltage of the symmetrical component voltages which are obtained in the symmetrical component calculation step, obtains wye-phase voltages based on the symmetrical component voltages and the compensation signal, the wye-phase voltages being 120° out of phase with each other as to which the unbalanced voltages have been compensated for, subjects the three-phase AC voltages to the PWM conversion based on the wye-phase voltages to generate the control signal for outputting the DC voltage, and the control signal generated in the unbalanced voltage compensation step controls a switching operation of the three-phase converter to subject the three-phase AC voltages to the PWM conversion and output the DC voltage.

12. The three-phase converter control method according to claim 11, wherein, the symmetrical component calculation step subjects each of the wye-phase voltages obtained in the centroid vector operation step to dq-axis conversion to calculate a d-axis voltage signal and a q-axis voltage signal, subjects the d-axis voltage signal and the q-axis voltage signal being calculated to frequency separation, obtains a positive-phase-sequence voltage from a DC component, and calculates a negative-phase-sequence voltage from an AC component.

13. The three-phase converter control method according to claim 11 or claim 12, wherein, the symmetrical component calculation step calculates the zero-phase-sequence voltage according to amplitude calculated from the negative-phase-sequence voltage and a phase calculated from the positive-phase-sequence voltage and the negative-phase-sequence voltage.

14. The three-phase converter control method according to claim 11 or claim 12, wherein, actual measurement values of the line voltages correspond one-to-one with the control signal, and one control signal is generated based on the actual measurement values of the line voltages at one measurement point of time.

15. The three-phase converter control method according to claim 13, wherein,
   actual measurement values of the line voltages correspond one-to-one with the control signal, and one control signal is generated based on the actual measurement values of the line voltages at one measurement point of time.

16. A controller of a three-phase converter for subjecting three-phase AC voltages to PWM conversion and outputting DC voltage, comprising,
   a centroid vector operation unit for obtaining from line voltages, wye-phase voltages which are 120° out of phase with each other,
   a symmetrical component calculation unit for calculating symmetrical component voltages of a three-phase balanced system, from the wye-phase voltages that are obtained by the centroid vector operation unit, and
   an unbalanced voltage compensation unit for forming a compensation signal for compensating for unbalanced voltages of three-phase AC voltages, and subjecting the three-phase AC voltages to the PWM conversion to generate a control signal for outputting the DC voltage, wherein,
   the centroid vector operation unit performs a vector operation as to all combinations of two line voltages which are selected from the line voltages, obtains centroid vector voltages which are directed to respective terminal voltages from a terminal-voltage centroid according to the vector operation, and renders the vector voltages respectively as the wye-phase voltages which are 120° out of phase with each other,
   the unbalanced voltage compensation unit generates the compensation signal for compensating for the unbalanced voltages of the three-phase AC voltages based on a zero-phase-sequence voltage of the symmetrical component voltages which are obtained in the symmetrical component calculation unit, obtains wye-phase voltages based on the symmetrical component voltages and the compensation signal, the wye-phase voltages being 120° out of phase with each other as to which the unbalanced voltages have been compensated for, subjects the three-phase AC voltages to the PWM conversion based on the wye-phase voltages to generate the control signal for outputting the DC voltage, and
   the control signal generated in the unbalanced voltage compensation unit controls a switching operation of the three-phase converter to subject the three-phase AC voltages to the PWM conversion and output the DC voltage.

17. The controller of the three-phase converter according to claim 16, wherein,
   the symmetrical component calculation unit subjects each of the wye-phase voltages obtained in the centroid vector operation unit to dq-axis conversion to calculate a d-axis voltage signal and a q-axis voltage signal, subjects the d-axis voltage signal and the q-axis voltage signal being calculated to frequency separation, obtains a positive-phase-sequence voltage from a DC component, calculates a negative-phase-sequence voltage from an AC component, and outputs the positive-phase-sequence voltage and the negative-phase-sequence voltage to the unbalanced voltage compensation unit.

18. The controller of the three-phase converter according to claim 16 or claim 17, wherein,
   the symmetrical component calculation unit calculates the zero-phase-sequence voltage according to amplitude calculated from the negative-phase-sequence voltage and a phase calculated from the positive-phase-sequence voltage and the negative-phase-sequence voltage, and outputs the zero-phase-sequence voltage to the unbalanced voltage compensation unit.

19. The controller of the three-phase converter according to claim 16 or claim 17, wherein,
   the unbalanced voltage compensation unit generates one control signal with respect to actual measurement values of the line voltages at one measurement point of time.

20. The controller of the three-phase converter according to claim 18, wherein,
   the unbalanced voltage compensation unit generates one control signal with respect to actual measurement values of the line voltages at one measurement point of time.

21. An unbalanced voltage compensation program for allowing a computer to execute each step of an unbalanced voltage compensation method in power conversion for subjecting three-phase AC voltages to PWM conversion and outputting DC voltage, comprising,
   a centroid vector operation step for obtaining from line voltages, wye-phase voltages which are 120° out of phase with each other,
   a symmetrical component calculation step for calculating symmetrical component voltages of a three-phase balanced system, from the wye-phase voltages that are obtained by the centroid vector operation step, and
   an unbalanced voltage compensation step for forming a compensation signal for compensating for unbalanced voltages of three-phase AC voltages, and subjecting the three-phase AC voltages to the PWM conversion to generate a control signal for outputting the DC voltage, wherein,
   the centroid vector operation step performs a vector operation as to all combinations of two line voltages which are selected from the line voltages, obtains centroid vector voltages which are directed to respective terminal voltages from a terminal-voltage centroid according to the vector operation, and renders the vector voltages respectively as the wye-phase voltages which are 120° out of phase with each other, and
   the unbalanced voltage compensation step generates the compensation signal for compensating for the unbalanced voltages of the three-phase AC voltages based on a zero-phase-sequence voltage of the symmetrical component voltages which are obtained in the symmetrical component calculation step, obtains wye-phase voltages based on the symmetrical component voltages and the compensation signal, the wye-phase voltages being 120° out of phase with each other as to which the unbalanced voltages have been compensated for, and subjects the three-phase AC voltages to the PWM conversion based on the wye-phase voltages to generate the control signal for outputting the DC voltage.

22. The unbalanced voltage compensation program according to claim 21, wherein,
   the symmetrical component calculation step subjects each of the wye-phase voltages obtained in the centroid vector operation step to dq-axis conversion to calculate a d-axis voltage signal and a q-axis voltage signal, subjects the d-axis voltage signal and the q-axis voltage signal being calculated to frequency separation, obtains a positive-phase-sequence voltage from a DC component, and calculates a negative-phase-sequence voltage from an AC component.

23. The unbalanced voltage compensation program according to claim 21 or claim 22, wherein,
   the symmetrical component calculation step calculates the zero-phase-sequence voltage according to amplitude calculated from the negative-phase-sequence voltage and a phase calculated from the positive-phase-sequence voltage and the negative-phase-sequence voltage.

24. The unbalanced voltage compensation program according to claim 21 or claim 22, wherein,
actual measurement values of the line voltages correspond one-to-one with the control signal, and one control signal is generated based on the actual measurement values of the line voltages at one measurement point of time.

25. The unbalanced voltage compensation program according to claim 23, wherein,
actual measurement values of the line voltages correspond one-to-one with the control signal, and one control signal is generated based on the actual measurement values of the line voltages at one measurement point of time.

* * * * *